(12) United States Patent
Suzuki et al.

(10) Patent No.: US 8,892,773 B2
(45) Date of Patent: Nov. 18, 2014

(54) PATH CONTROL APPARATUS, PATH CONTROL METHOD, PATH CONTROL PROGRAM, AND NETWORK SYSTEM

(75) Inventors: Kazuya Suzuki, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 493 days.

(21) Appl. No.: 13/139,555
(22) PCT Filed: Dec. 24, 2009
(86) PCT No.: PCT/JP2009/007203
§ 371 (c)(1), (2), (4) Date: Jun. 14, 2011
(87) PCT Pub. No.: WO2010/073674
PCT Pub. Date: Jul. 1, 2010

(65) Prior Publication Data
US 2011/0258341 A1 Oct. 20, 2011

(30) Foreign Application Priority Data

Dec. 26, 2008 (JP) .................................. 2008-333171

(51) Int. Cl.
| | | |
|---|---|---|
| *G06F 15/173* | (2006.01) | |
| *G06F 15/16* | (2006.01) | |
| *H04L 12/721* | (2013.01) | |
| *H04L 12/751* | (2013.01) | |

(52) U.S. Cl.
CPC ............... *H04L 45/12* (2013.01); *H04L 45/02* (2013.01); *H04L 45/025* (2013.01)
USPC ........... 709/241; 709/201; 709/202; 709/203; 709/217; 709/218; 709/219; 709/220; 709/221; 709/222; 709/223; 709/224; 709/225; 709/226; 709/238; 709/239; 709/240; 709/242; 709/243; 709/244; 370/232; 370/238; 370/241; 370/252; 370/254; 370/255; 370/400; 370/401

(58) Field of Classification Search
CPC ........................................................ H04L 45/02
USPC ......... 709/201, 202, 203, 217, 218, 219, 220, 709/221, 222, 223, 224, 225, 226, 238, 239, 709/240, 241, 242, 243, 244; 370/232, 238, 370/241, 252, 254, 255, 400, 401

IPC ........... H04L 45/02,45/28, 45/00, 45/22, 45/12, H04L 45/50, 45/04, 45/123, 45/24, 45/48, H04L 45/16, 45/122, 45/38, 45/44, 45/20, H04L 45/245

See application file for complete search history.

(56) References Cited

U.S. PATENT DOCUMENTS 5,265,092 A * 11/1993 Soloway et al. ............... 370/238
6,347,078 B1 * 2/2002 Narvaez-Guarnieri et al. ............................ 370/230

(Continued)

FOREIGN PATENT DOCUMENTS

| JP | 2002354012 A | 12/2002 |
| JP | 2006140834 A | 6/2006 |

(Continued)

OTHER PUBLICATIONS

Japanese Office Action for JP Application No. 2010-543890 mailed on May 28, 2013 with Partial English Translation.

(Continued)

*Primary Examiner* — Saket K Daftuar
(74) *Attorney, Agent, or Firm* — Sughrue Mion, PLLC

(57) ABSTRACT

A path control apparatus of the present invention includes: a status change detecting unit that detects a status change of a network; a path calculating unit that decides a path in accordance with the status of the network; and a calculation execution node deciding unit that compares a shortest path tree, which is established before occurrence of a change in the status of the network calculated by the path calculating unit, with a shortest path tree, which is established after the occurrence of the change in the status of the network calculated by the path calculating unit, and creates information required for determining whether a node apparatus in the network needs a path update, when the change occurs in the status of the network.

20 Claims, 20 Drawing Sheets

(56) References Cited

U.S. PATENT DOCUMENTS

| | | | |
|---|---|---|---|
| 6,370,119 B1* | 4/2002 | Basso et al. | 370/252 |
| 6,377,543 B1* | 4/2002 | Grover et al. | 370/227 |
| 6,765,880 B1* | 7/2004 | Hillard et al. | 370/255 |
| 7,002,917 B1* | 2/2006 | Saleh | 370/238 |
| 7,814,227 B2* | 10/2010 | Vasseur et al. | 709/241 |
| 7,986,640 B2* | 7/2011 | Previdi et al. | 370/255 |
| 2002/0004843 A1* | 1/2002 | Andersson et al. | 709/238 |
| 2002/0174207 A1* | 11/2002 | Battou | 709/223 |
| 2004/0090913 A1* | 5/2004 | Scudder et al. | 370/219 |
| 2004/0196846 A1* | 10/2004 | Salonen | 370/392 |
| 2005/0265255 A1* | 12/2005 | Kodialam et al. | 370/252 |
| 2006/0200579 A1* | 9/2006 | Vasseur et al. | 709/238 |
| 2006/0209716 A1* | 9/2006 | Previdi et al. | 370/254 |
| 2007/0208874 A1* | 9/2007 | Previdi et al. | 709/238 |

FOREIGN PATENT DOCUMENTS

| | | |
|---|---|---|
| JP | 2006-279482 A | 10/2006 |
| JP | 2007258926 A | 10/2007 |
| WO | 2009/130941 A1 | 10/2009 |

OTHER PUBLICATIONS

International Search Report for PCT/JP2009/007203, mailed Feb. 2, 2010.

J. Moy, "OSPF Version 2", Network Working Group, RFC 2328, Internet Engineering Task Force, Apr. 1998.

R. Coltun, "The OSPF Opaque LSA Option", Network Working Group, RFC 2370, Internet Engineering Task Force, Jul. 1998.

* cited by examiner

FIG. 5

| 0 | 8 | 16 | 24 | 31 |
|---|---|---|---|---|
| Link State Age | | Options | | Link State Type |
| Opaque Type | | Opaque ID | | |
| Advertising Router | | | | |
| Link State Sequence Number | | | | |
| Link State Checksum | | Length | | |

FIG. 6

| | 0 | 8 | 16 | 24 | 31 | |
|---|---|---|---|---|---|---|
| F20 → | Router Num | | Unused | | | ← F21 |
| F31 → | Update Router 1 | | | | | |
| F32 → | Update Router 2 | | | | | |
| F3ₙ → | ... | | | | | |

PATH CONTROL APPARATUS, PATH CONTROL METHOD, PATH CONTROL PROGRAM, AND NETWORK SYSTEM

TECHNICAL FIELD

The present invention relates to a network system that dynamically performs path control, and a path control apparatus, a path control method, and a path control program in such a network system.

BACKGROUND ART

With popularization of network technology represented by the Internet, improvement in network stability becomes imperative. Network reliability is improved by redundantly configuring a node apparatus and a link constituting the network beforehand and performing dynamic path control. In a network in which the dynamic path control is performed, node apparatuses constituting the network exchange information relating to each other's connection status, and autonomously decide an optimum path based on these pieces of information. For example, when there is a failure in a link connecting to its own apparatus or an adjacent node apparatus, a node apparatus having detected the failure informs other node apparatuses of this matter. Accordingly, all the node apparatuses in the network perform path calculation in a state with the node apparatus or link having the failure being excluded, to decide a new path. Thus, even if a failure occurs, the dynamic path control enables communication service to be maintained continuously by only the remaining node apparatuses and links.

In Patent Document 1, the following method has been proposed. A node installed in the network self-calculates or acquires tree information of the network from other nodes to ascertain the tree information. The node extracts beforehand a set of nodes that includes an input/output link of the own node as a part of the tree, as an extent of the impact of a link failure, based on the ascertained tree information. The node notifies detection of the failure, limiting to the extent of the impact, when having detected the link failure. When the own node detects the failure, or receives the notification from another node, the node recalculates the path.

In order to realize such dynamic path control, a path control protocol as shown in Non-patent Document 1 has been standardized by the Internet Engineering Task Force (IETF), which is a standard-setting organization.

PRIOR ART DOCUMENTS

Patent Document

[Patent Document 1] Japanese Unexamined Patent Application, First Publication No. 2007-258926

Non-patent Document

[Non-patent Document 1] J. Moy: "OSPF Version 2", RFC 2328, Internet Engineering Task Force, 1998.

SUMMARY OF THE INVENTION

Problem to be Solved by the Invention

When there is a failure in the link or node constituting the network, the failure is notified to the entire network. A node having received the notification, recalculates the path based on a topology in which the link having the failure is excluded, to update the own path table. Generally, a node apparatus away from a failure location may not have a large difference in the content of the path tables before and after occurrence of the failure. However, it is not found until recalculation of the path is performed after occurrence of the failure. Therefore, when there is a failure in the network, all nodes need to perform path calculation. Accordingly, in such a case that a plurality of failures continuously occur within a short period of time, there is an increasing load on path calculation in each node, thereby affecting other types of processing.

In Patent Document 1, a method of determining a node affected by the link failure by comparing pieces of tree information of respective nodes is proposed. In this proposal, however, exchange of tree information with each other needs to be performed beforehand among all nodes. Therefore, when the number of nodes constituting the network increases, pieces of tree information to be exchanged increase, thereby increasing the load for information exchange. Patent Document 1 also describes a self-calculating method without exchanging the tree information. When the number of nodes constituting the network increases, however, tree information designating each node as a root needs to be calculated, thereby increasing the calculation load.

In order to solve the above problems, one exemplary object of the present invention is to provide a network system in which the load on path calculation in the entire network is low, thereby enabling to realize high stability, and a path control apparatus, a path control method, and a path control program in such a network system.

Means for Solving the Problem

A path control apparatus of the present invention includes: a status change detecting unit that detects a status change of a network; a path calculating unit that decides a path in accordance with the status of the network; and a calculation execution node deciding unit that compares a shortest path tree, which is established before occurrence of a change in the status of the network calculated by the path calculating unit, with a shortest path tree, which is established after the occurrence of the change in the status of the network calculated by the path calculating unit, and creates information required for determining whether a node apparatus in the network needs a path update, when the change occurs in the status of the network.

A path control method for a path control apparatus of the present invention, includes the steps of: detecting a status change of a network; deciding a path in accordance with the status of the network; and comparing a shortest path tree, which is established before occurrence of a change in the status of the network calculated in the step of deciding a path, with a shortest path tree, which is established after the occurrence of the change in the status of the network, and creating information required for determining whether a node apparatus in the network needs a path update, when the change occurs in the status of the network.

A network system of the present invention includes: a status change detecting unit that detects a status change of a network; a path calculating unit that decides a path in accordance with the status of the network; and a calculation execution node deciding unit that compares a shortest path tree; which is established before occurrence of a change in the status of the network calculated by the path calculating unit, with a shortest path tree, which is established after the occurrence of the change in the status of the network calculated by the path calculating unit, and creates information required for determining whether a node apparatus in the network needs a path update, when the change occurs in the status of the network.

Effect of the Invention

According to exemplary embodiments of the present invention, a node that detects a failure decides a node, which should perform path calculation, beforehand by using a path calculation result before the occurrence of the failure and a path calculation result after the occurrence of the failure. The failure detecting node notifies an ID of the decided node together with a message notifying the link failure, so that path calculation is not performed in a node that does not require a path update. Accordingly, a decrease in the load in the entire network is realized, to realize improvement in the network stability.

In Patent Document 1, the tree information received from other nodes is used in order to decide a node affected by the link failure. On the other hand, in exemplary embodiments of the present invention, the shortest path tree acquired in the process of path calculation performed by the path calculating unit is used, which is the point that is different from Patent Document 1. In the exemplary embodiments of the present invention, therefore, there is an advantage in that it is not required to acquire the information required for deciding the node affected by the link failure from other nodes. Moreover, when comparing with the method in Patent Document 1, in which the tree information is self-calculated, the node affected by the link failure can be decided with less amount of calculation in the exemplary embodiments of the present invention.

BRIEF DESCRIPTION OF THE DRAWINGS

FIG. 5 is a diagram showing a configuration of each field of an LSA header in an OSPF message in the first exemplary embodiment of the present invention.

FIG. 6 is a diagram showing a configuration of each field of an update-requiring node LSA according to the first exemplary embodiment of the present invention.

EXEMPLARY EMBODIMENTS FOR CARRYING OUT THE INVENTION

Figure 1:
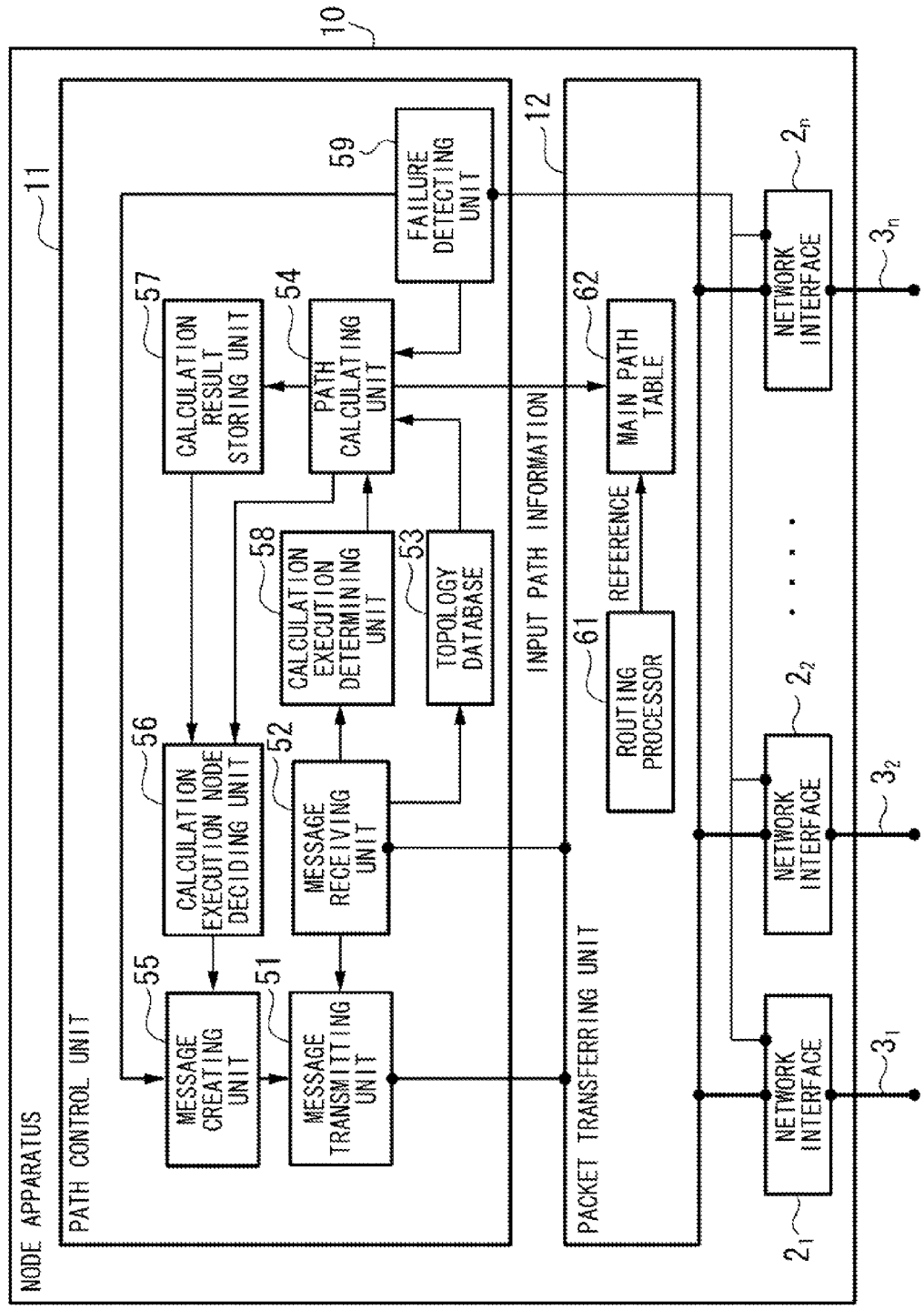
FIG. 1 is a block diagram showing a configuration of a node apparatus according to a first exemplary embodiment of the present invention.

Hereunder exemplary embodiments of the present invention are explained with reference to the drawings.
<First Exemplary Embodiment>
FIG. 1 is a block diagram showing a functional configuration of a node apparatus (path control apparatus) according to a first exemplary embodiment of the present invention.

In FIG. 1, a node apparatus 10 according to the first exemplary embodiment of the present invention includes a path control unit 11, a packet transferring unit 12, and network interfaces $2_1$ to $2_n$. The path control unit 11 exchanges path information and the like between other node apparatuses to create a path table to be used for packet transfer. The packet transferring unit 12 transfers a packet based on information of the path table created by the path control unit 11. The network interfaces $2_1$ to $2_n$ connect to external networks $3_1$ to $3_n$.

The path control unit 11 includes a message transmitting unit 51, a message receiving unit 52, a topology database 53, a path calculating unit 54, a message creating unit 55, a calculation execution node deciding unit 56, a calculation result storing unit 57, a calculation execution determining unit 58, and a status change detecting unit 59.

The message transmitting unit 51 transmits a message in a path control protocol to other node apparatuses. The message receiving unit 52 receives a message in the path control protocol from other node apparatuses. The topology database 53 stores path information acquired by the message receiving unit 52 from other node apparatuses. The path calculating unit 54 calculates a path by using the path information stored in the topology database 53, upon reception of an operation instruction from the calculation execution determining unit 58 or the status change detecting unit 59. The message creating unit 55 creates a message in the path control protocol based on a calculation-requiring node decided by the calculation execution node deciding unit 56 and a failure detected by the status change detecting unit 59. The calculation execution node deciding unit 56 compares a shortest path tree established based on a topology before a link failure, which is stored in the calculation result storing unit 57 with a shortest path tree established based on a topology after the occurrence of the link failure, which is calculated by the path calculating unit 54 to decide the calculation-requiring node. The calculation result storing unit 57 stores the shortest path tree calculated by the path calculating unit 54. The calculation execution determining unit 58 determines whether to perform path calculation itself based on the message in the path control protocol received by the message receiving unit 52. The status change detecting unit 59 monitors the network interfaces $2_1$ to $2_n$ to detect the link failure.

The packet transferring unit 12 includes a routing processor 61 and a main path table 62 including a table for deciding the next forwarding destination and from which network interface to send the packet, from the destination of the packet. The routing processor 61 transfers the packet received via the network interfaces $2_1$ to $2_n$. The main path table 62 includes a table for deciding the next forwarding destination and from which network interface to send the packet, from the destination of the packet.

Figure 2:
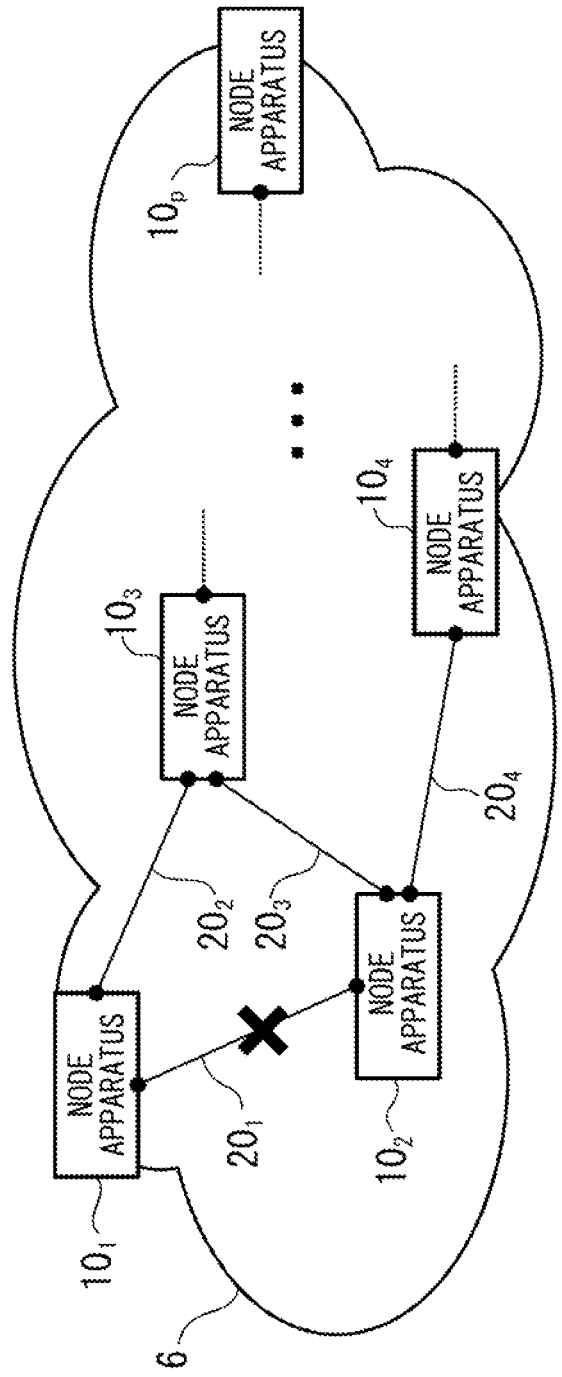
FIG. 2 is a network diagram in which the node apparatus according to the first exemplary embodiment of the present invention is arranged.

FIG. 2 is a diagram showing a network 6 including node apparatuses $10_1$ to $10_p$ according to the first exemplary embodiment of the present invention. A case in which a failure has occurred in a link $20_1$ connecting the node apparatuses $10_1$ and $10_2$ in FIG. 2 is explained. At this time, the node apparatuses $10_1$ and $10_2$ connected to the failure link $20_1$ behave differently from other nodes.

At first an operation of the node connected to the failure node is explained with reference to FIG. 3.

The status change detecting unit 59 in FIG. 1 notifies the path calculating unit 54 of a detected link failure (step S101). The path calculating unit 54 calculates a path based on topology information excluding the failure link notified from the status change detecting unit 59 from the topology information stored in the topology database 53 to update the main path table 62 (step S102).

Then the path calculating unit 54 transmits a shortest path tree in a calculation result to the calculation result storing unit 57 and the calculation execution node deciding unit 56 (step S103).

Figure 4:
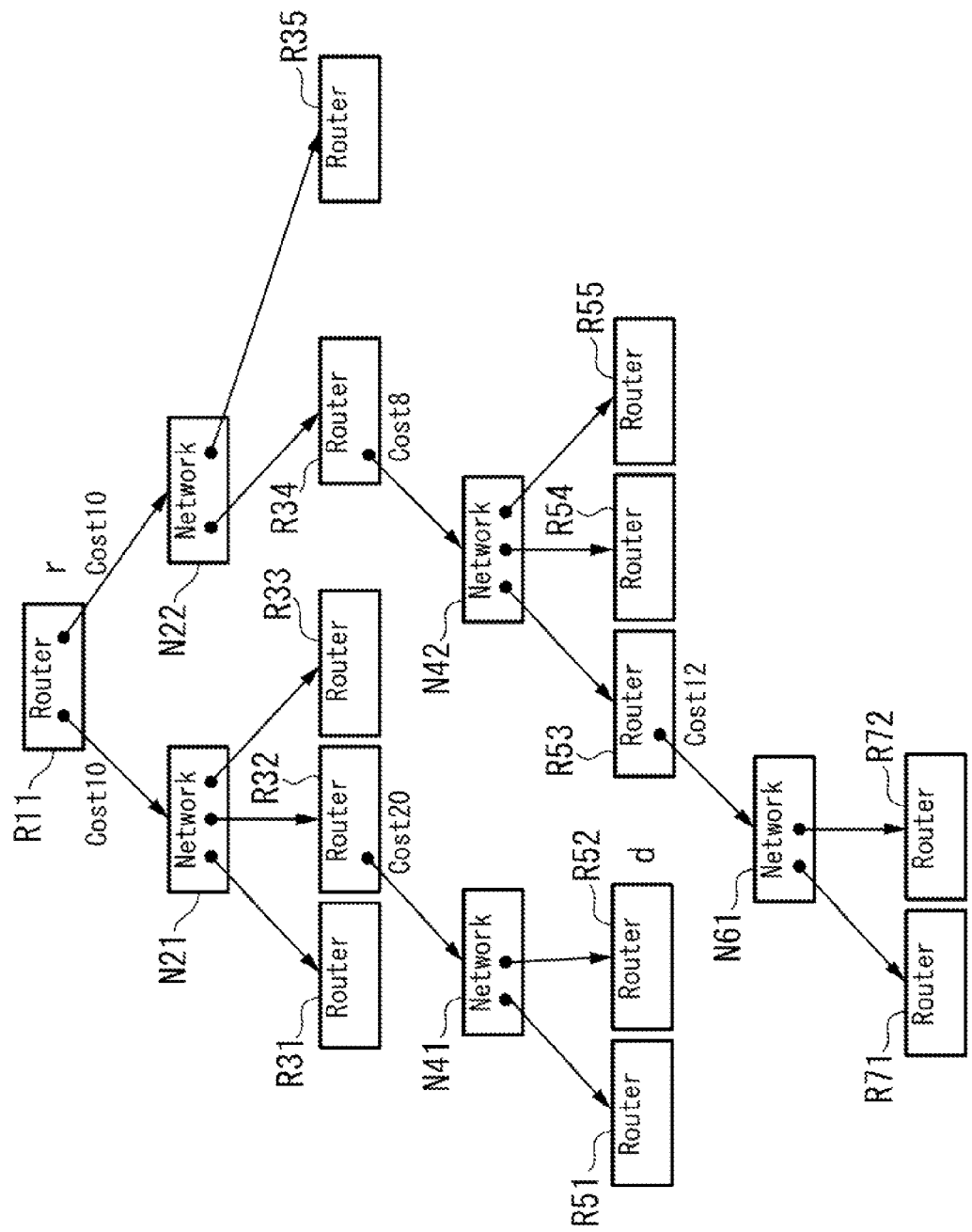
FIG. 4 is a diagram showing a shortest path tree structure formed at the time of calculating a path in the first exemplary embodiment of the present invention.

FIG. 4 is a diagram showing an information configuration of the shortest path tree acquired in step S103. Here a shortest path tree of a network including routers R11, R31 to R35, R51 to R55, R71, and R72, and networks N21, N22, N41, N42, and N61 is acquired.

Figure 3:
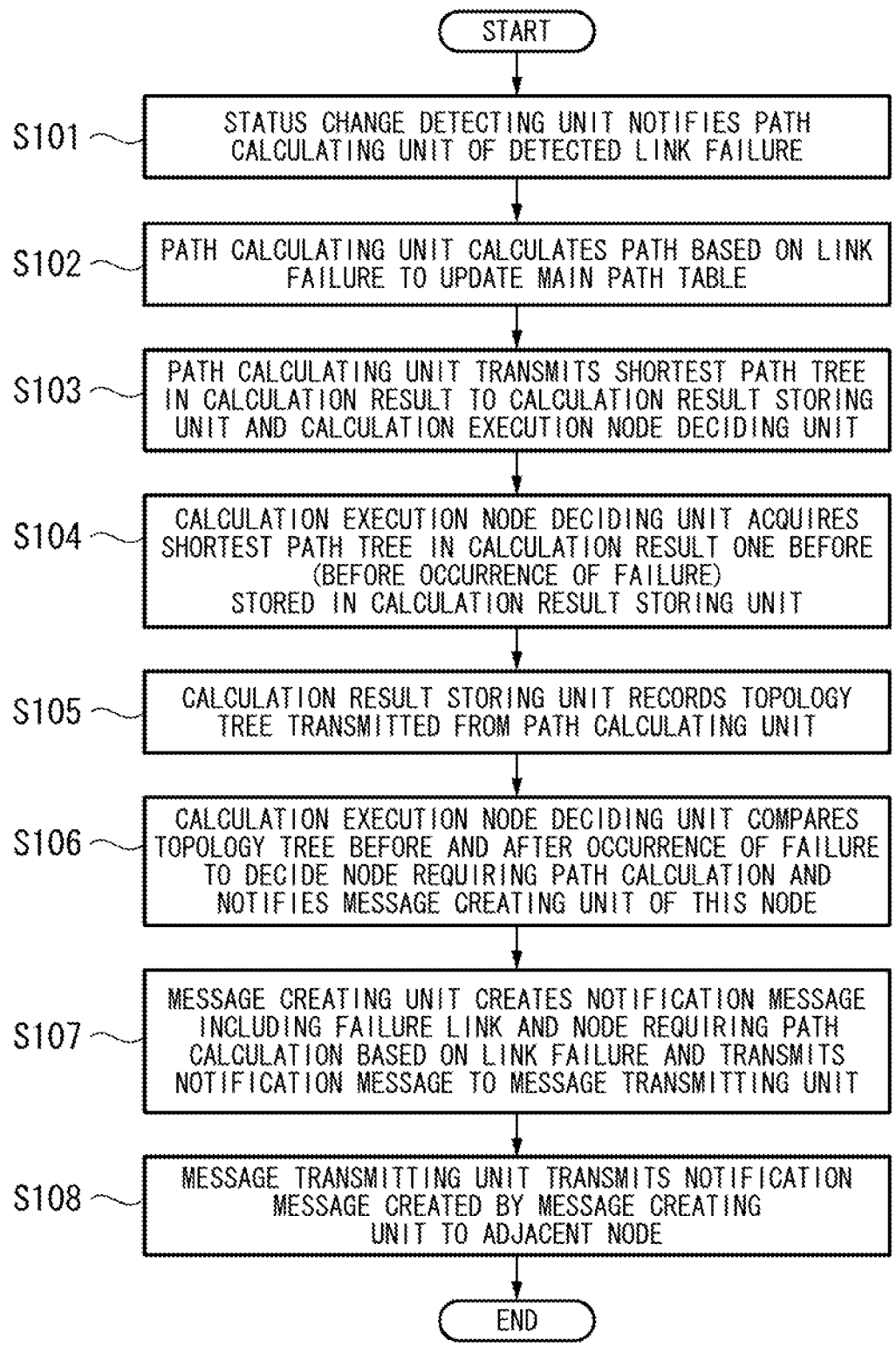
FIG. 3 is a flowchart showing an operation of a node apparatus connected to a failure link according to the first exemplary embodiment of the present invention.

In FIG. 3, the calculation execution node deciding unit 56 then acquires information of the shortest path tree before the occurrence of the link failure, which is a calculation result one before that stored in the calculation result storing unit 57 (step S104). The calculation result storing unit 57 records the shortest path tree transmitted from the path calculating unit 54 (step S105).

The calculation execution node deciding unit 56 compares the shortest path tree established before the occurrence of the failure and the shortest path tree established after the occurrence of the failure to decide a node requiring path calculation. Then the calculation execution node deciding unit 56 notifies the message creating unit 55 of the node requiring path calculation (step S106). The message creating unit 55 creates a notification message including the failure link notified from the status change detecting unit 59 and an ID for identifying the node requiring path calculation decided by the calculation execution node deciding unit 56, and transmits the notification message to the message transmitting unit 51 (step S107). The message transmitting unit 51 transmits the notification message created by the message creating unit 116 to an adjacent node (step S108).

The notification message created by the message creating unit 55 in the process in step S107 in FIG. 3 is explained next.

Information is exchanged in a unit referred to as link state advertisement (LSA) between the respective node apparatuses in the network operated by Open Shortest Path First (OSPF), and the information is used for the path calculation. In the LSA, a scalable format that can be generally used for adding a function is defined as an opaque LSA in "R. Coltun: "The OSPF opaque LSA option", RFC 2370, Internet Engineering Task Force, 1998", other than a format defined in "J. Moy: "OSPF version 2", RFC 2328, Internet Engineering Task Force, 1998.". The opaque LSA is used in the present exemplary embodiment for notifying a node that requires path calculation.

FIG. 5 shows a format of a part referred to as an LSA header. This part is used in common regardless of LSA type. FIG. 6 shows a packet format of an update-requiring node LSA in the present exemplary embodiment. The LSA header shown in FIG. 5 is followed by the packet format.

The number of node requiring updates stored in the LSA is stored in the Router Num field F20 in FIG. 6. Update Router fields F31 to $F3_n$ are prepared for the number specified in the Router Num field F20, and IDs for identifying the node requiring update are respectively stored therein. A router ID or the like used for identifying a node (router) can be generally used as the ID in the OSPF. Here a case of using the OSPF has been explained. However, the present exemplary embodiment can be applied by storing information in the same manner in other protocols.

Next the process in step S106 in FIG. 3 executed by the calculation execution node deciding unit 56 is explained in detail with reference to FIG. 7.

Figure 8:
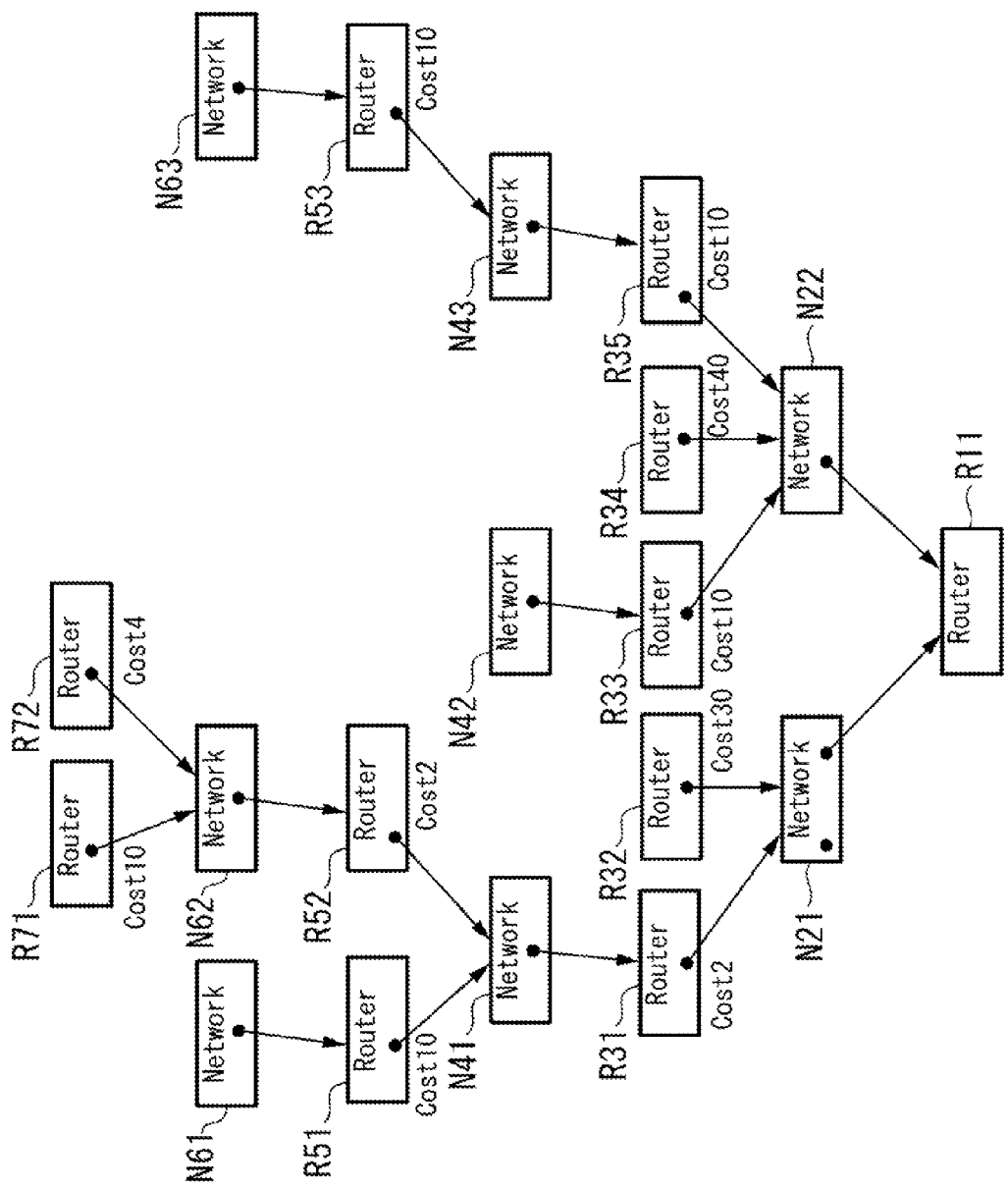
FIG. 8 is a diagram showing a shortest path tree structure in an opposite direction formed at the time of performing the determination process of the calculation-requiring node according to the first exemplary embodiment of the present invention.

At first a shortest path tree $T^R$ in an opposite direction is calculated, designating the own node (node r) as an end point (step S201). FIG. 8 is an example of the shortest path tree in the opposite direction acquired in step S201. The shortest path tree in the opposite direction of the network including routers R11, R31 to R35, R51, R52, R53, R71, and R72, and networks N21, N22, N41 to N43, N61 to R63 is acquired.

Figure 7:
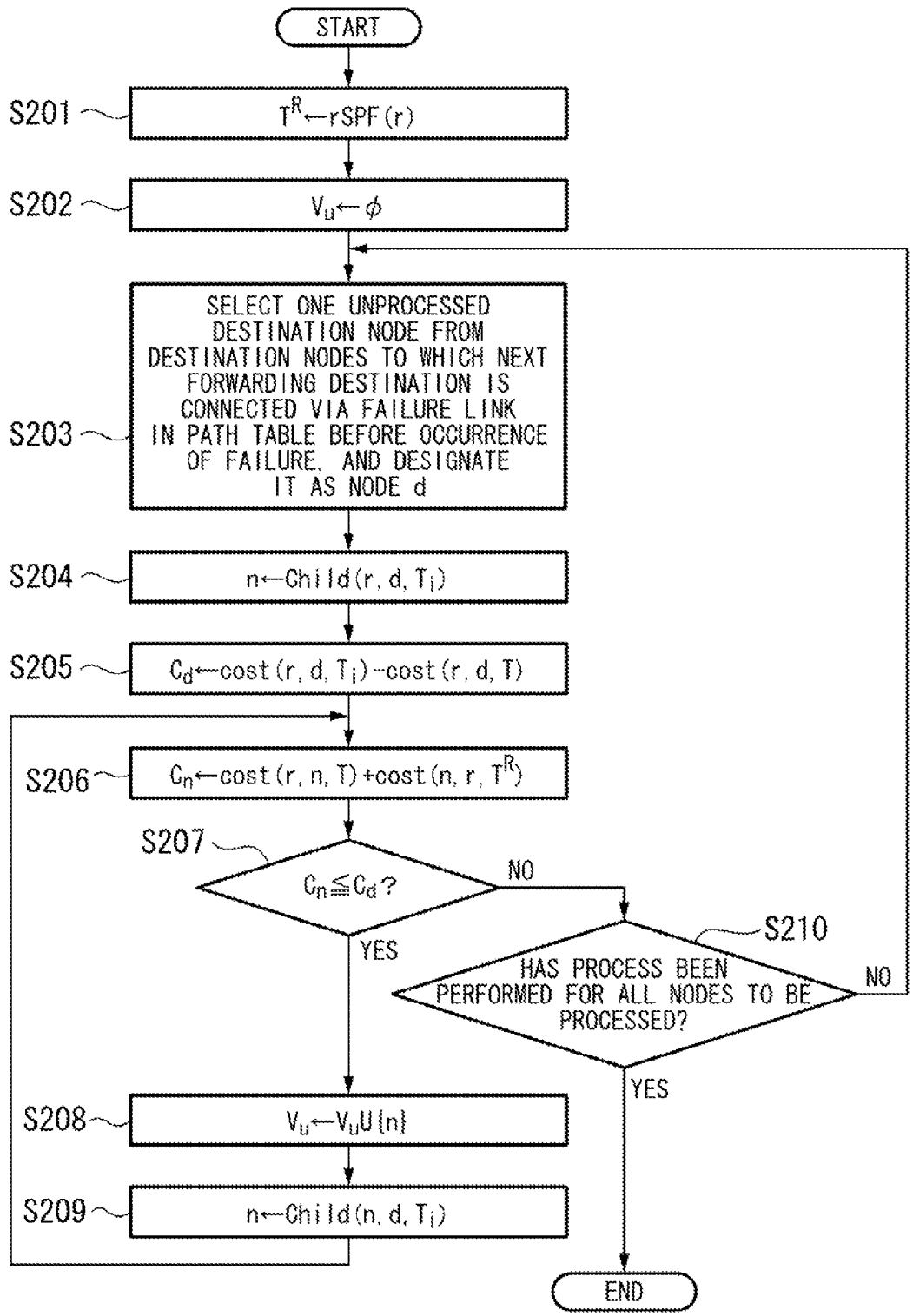
FIG. 7 is a flowchart showing a determination process of a calculation-requiring node according to the first exemplary embodiment of the present invention.

Next, in FIG. 7, a set $V_u$ for storing the calculation-requiring node is initialized (step S202). Then a node connected to the next forwarding destination via the failure link in the path table before the occurrence of the failure is set as a processing target. A node of the destination nodes, for which processes in steps thereafter have not been performed is set, and is designated as node d (step S203). That is to say, a destination node for which the next forwarding destination is changed due to a link failure is set as a processing target.

Next a shortest path tree $T_i$ after the occurrence of the failure is referred to, and a node following the own node in the path from the own node to the node d selected in step S203 is selected, and the node is referred to as node n (step S204).

Then a value is obtained by subtracting the cost for a path from the own node to node d in the shortest path tree T before the occurrence of the failure from the cost for a path from the own node to node d in the shortest path tree $T_l$ after the occurrence of the failure, and the value is referred to as value $C_d$ (step S205).

Then total value $C_n$ is obtained of the cost for the path from the own node to node n in the shortest path tree T before the occurrence of the failure and the cost for the path from node n to the own node in the shortest path tree $T^R$ in the opposite direction (step S206), and then the values $C_n$ and $C_d$ are compared with each other (step S207). When the value $C_n$ is larger than the value $C_d$ in step S207, control proceeds to step S210.

When the value $C_n$ is smaller than or equal to the value $C_d$ in step S207, it is determined that node n is the calculation-requiring node, and it is added to the set $V_u$ (step S208).

Then the shortest path tree $T_l$ after the occurrence of the failure is referred to, and a node following node n in the path from the own node to node d selected in step S203 is decided, and the decided node is designated as new node n, and returns to step S206 (step S209).

When the value $C_n$ is larger than the value $C_d$ in the comparison performed in step S207, if the processes after step S204 have not been performed with respect to all the nodes to be processed in step S203, the processing returns to step S203. If the processes have been performed, all the processes are finished (step S210). The node included in the set $V_u$ at the end of the process becomes the calculation-requiring node.

A method for calculating the cost for a path between the nodes in the shortest path tree is explained below.

For example, it is assumed that the router R52 in FIG. 4 is node d. In this case, the path starts from the router R11 expressing the own node, reaches the router R32 via the network N21, and then reaches the router R52 via the network N41. At this time, "30", which is the total value of Cost "10" to the network N21 in the router R11 and cost "20" to the network N41 in the router R32, is the cost from the own node to the router R52.

In the process in steps S205 to S207 shown in FIG. 7, the cost for the path is used, which generally represents a concept of distance. For example, other indexes expressing distance such as metric can be used instead of the cost.

The principle for deciding the calculation-requiring node in the process shown in FIG. 7 is explained next with reference to FIG. 9.

Figure 9:
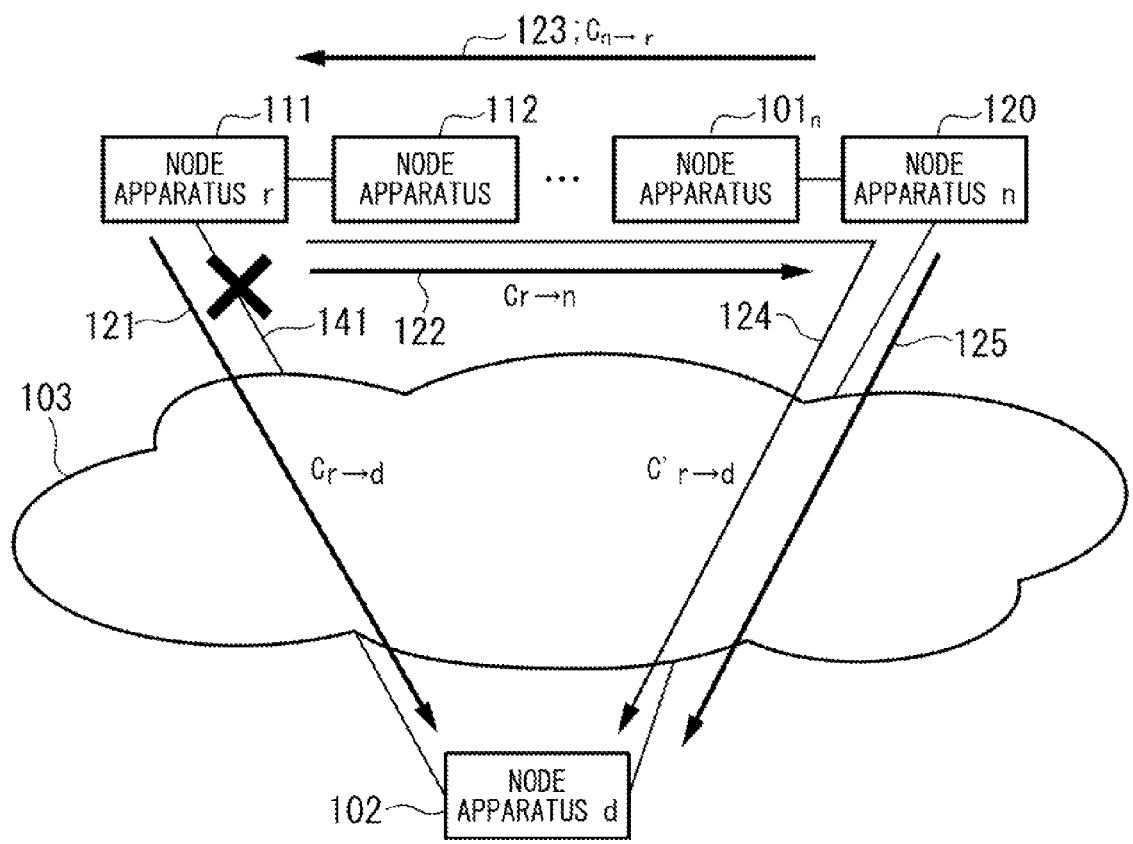
FIG. 9 is an explanatory diagram of an inequation expression used in the determination process of the calculation-requiring node according to the first exemplary embodiment of the present invention.

In FIG. 9, it is assumed that a failure has occurred in a link 141 connected to a node apparatus 111. At this time, a path from the node apparatus 111 to a node apparatus 102 is considered. In FIG. 9, reference symbol 103 indicates a network. The cost in a shortest path 121 before the occurrence of the failure from the node apparatus 111 to the node apparatus 102 is referred to as $C_{r \to d}$. The cost in a shortest path 124 after the occurrence of the failure from the node apparatus 111 to the node apparatus 102 is referred to as $C'_{r \to d}$. It is also assumed that a path from the node apparatus 111 to a node apparatus $101_n$ has been updated due to a link failure. In this case, it is considered whether a node apparatus 120 connected to the node apparatus $101_n$ along the shortest path 124 after the occurrence of the failure requires path calculation. The cost from the node apparatus 120 to the node apparatus 111 is referred to as $C_{n \to r}$ and the cost for a path in the opposite direction is referred to as $C_{r \to n}$.

At the time of specifying the node apparatus 102 as destination, when the cost for a path 125, which does not pass through the node apparatus 111 and the failure link, is larger than or equal to the cost for paths (path 123+path 121), which pass through the node apparatus 111 and the failure link, the node apparatus 120 may transmit a packet addressed to the node apparatus 102 to the node apparatus $101_n$, thereby causing a loop. Therefore, path update is required for the node apparatus 120. Here because the cost for the path 125 is a value obtained by subtracting the cost for the path 122 from the cost for the path 124 ($C'_{r \to d} - C_{r \to n}$), the condition requiring path update for the node apparatus 120 can be expressed as follows.

$$C_{r \to d} + C_{n \to r} \leq C'_{r \to d} - C_{r \to n}$$

This equation can be modified as described below.

$$C_{n \to r} + C_{r \to n} \leq C'_{r \to d} - C_{r \to d}$$

The value $C_d$ obtained by the process in step S205 in FIG. 7 corresponds to the value on the right side of the inequation. Moreover the value $C_n$ obtained by the process in step S206 in FIG. 7 corresponds to the value on the left side of the inequation. Comparison between these cost values is performed in FIG. 7 sequentially along the shortest path from the node apparatus 111 addressed to the node apparatus 102.

When an algorithm shown in FIG. 7 is applied to FIG. 9, at first the node apparatus 112 adjacent to the node apparatus 111 is set as node n in step S204 to perform a comparison process of the cost values in steps S205 to S207.

When the node apparatus 112 is determined as a calculation-requiring node, a node apparatus adjacent to the node apparatus 112 is set as new node n in step S209 to repeat the processes after step S206. In this way, the process of sequentially checking the cost until the inequation is not satisfied along the shortest path is performed in the algorithm shown in FIG. 7.

The case in which the node apparatus 102 is specified as destination has been considered with reference to FIG. 9; however, other destinations need to be checked in the same manner. The node apparatus 111 needs to change the path with respect to the destination for which the path passes through the failure link. On the other hand, the node apparatus 111 need not change the path to other destinations for which the path does not pass through the failure link. Therefore, in step S203 in FIG. 7, the node connected to the next forwarding destination via the failure link in the path table before the occurrence of the failure is set as a processing target, and a node for which the process has not been performed is selected as one destination to perform the subsequent process. In step S210 in FIG. 7, it is checked whether the process has been performed with respect to all the nodes specified as the processing target in step S203, and when the process has not been performed with respect to all the nodes, the processing returns to step S203.

An operation of the node, which is not connected to the failure link, is explained next with reference to FIG. 10.

The message receiving unit 52 shown in FIG. 1 transmits the failure notification message received from the adjacent node to the message transmitting unit 51, the calculation execution determining unit 58, and the topology database 53 (step S301). Then the topology database 53 updates the stored topology information based on the notification message transmitted from the message receiving unit 52 (step S302). The message transmitting unit 51 then transfers the notification message transmitted from the message receiving unit to another adjacent node (step S303).

The calculation execution determining unit 58 confirms whether the own ID is included in the notification message as the node requiring path calculation (step S304). When the own ID is not included in the notification message in step S304, the calculation execution determining unit 58 finishes all the processes.

When the own ID is included in the notification message in step S304, the path calculating unit 54 performs path calculation based on the topology information stored in the topology database 53 to update the main path table 62 (step S305).

The path calculating unit 54 then transmits the shortest path tree in the calculation result to the calculation result storing unit 57 (step S306). The calculation result storing unit 57 records the shortest path tree transmitted from the path calculating unit 54 (step S307), to finish all the processes. According to these operations, the path calculation performed by the node, which is not connected to the failure link, is limited only to a case in which the own ID is included in the notification message, thereby enabling to keep the processing load on the entire network low.

<Second Exemplary Embodiment>

Figure 11:
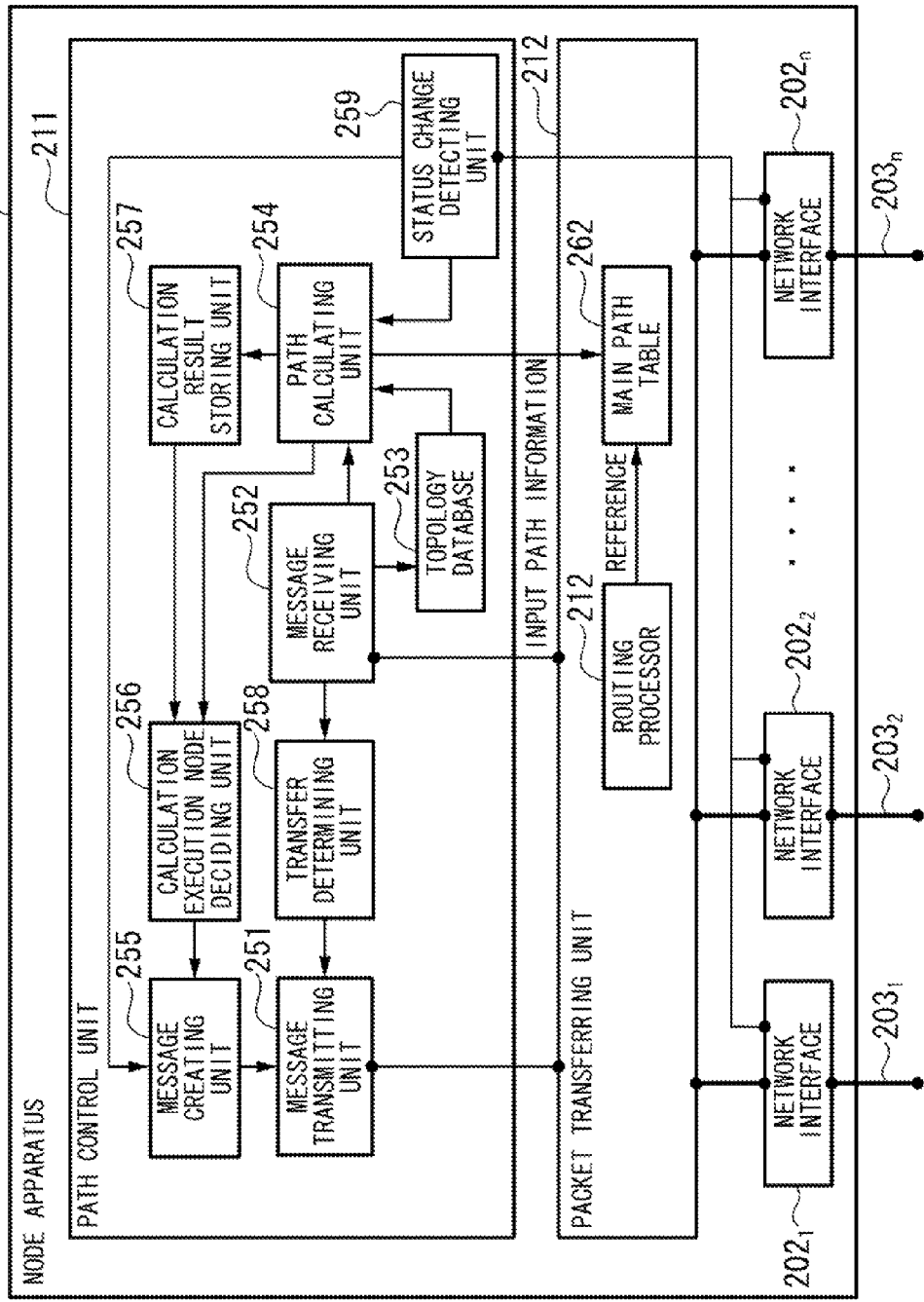
FIG. 11 is a block diagram showing a configuration of a node apparatus according to a second exemplary embodiment of the present invention.

A second exemplary embodiment of the present invention is explained next. FIG. 11 shows the second exemplary embodiment of the present invention.

A path control unit 211, a packet transferring unit 212, external networks $203_1$ to $203_n$, and network interfaces $202_1$ to $202_n$ of a node apparatus (path control apparatus) 210 according to the second exemplary embodiment of the present invention are the same as the path control unit 11, the packet transferring unit 12, the external networks $3_1$ to $3_n$, and the network interfaces $2_1$ to $2_n$ of the node apparatus 10 according to the first exemplary embodiment. Moreover, a message transmitting unit 251, a message receiving unit 252, a topology database 253, a path calculating unit 254, a message creating unit 255, a calculation execution node deciding unit 256, a calculation result storing unit 257, and a status change detecting unit 259 of the path control unit 211 in the second exemplary embodiment are the same as the message transmitting unit 51, the message receiving unit 52, the topology database 53, the path calculating unit 54, the message creating unit 55, the calculation execution node deciding unit 56, the calculation result storing unit 57, and the status change detecting unit 59 of the path control unit 11 in the first exemplary embodiment. Furthermore, a routing processor 261 and a main path table 262 of the packet transferring unit 212 in the second exemplary embodiment are the same as the routing processor 61 and the main path table 62 of the packet transferring unit 12 in the first exemplary embodiment.

The configuration of the node apparatus 210 in this exemplary embodiment is different from the configuration (FIG. 1) of the node apparatus 10 in the first exemplary embodiment in that a transfer determining unit 258 is provided instead of the calculation execution determining unit 58.

The transfer determining unit 258 refers to a notification message received from the message receiving unit 252, and immediately transmits the notification message to the message transmitting unit 251 when the own ID is included in the notification message. When the own ID is not included therein, the transfer determining unit 258 waits for a preset time, and transmits the notification message to the message transmitting unit 251.

In the first exemplary embodiment, path calculation is performed only by a calculation-requiring node specified by a node that has detected a failure, thereby reducing the load on the entire network. In the present exemplary embodiment, the notification message is quickly propagated to the calculation-requiring node specified by the node having detected the failure, and a delay is inserted in propagation of the notification message to other nodes, thereby realizing a reduction of the load on the entire networks by temporal load distribution.

An operation in the present exemplary embodiment is explained next. The operation of the node connected to the failure link is the same as that in the first exemplary embodiment.

Figure 12:
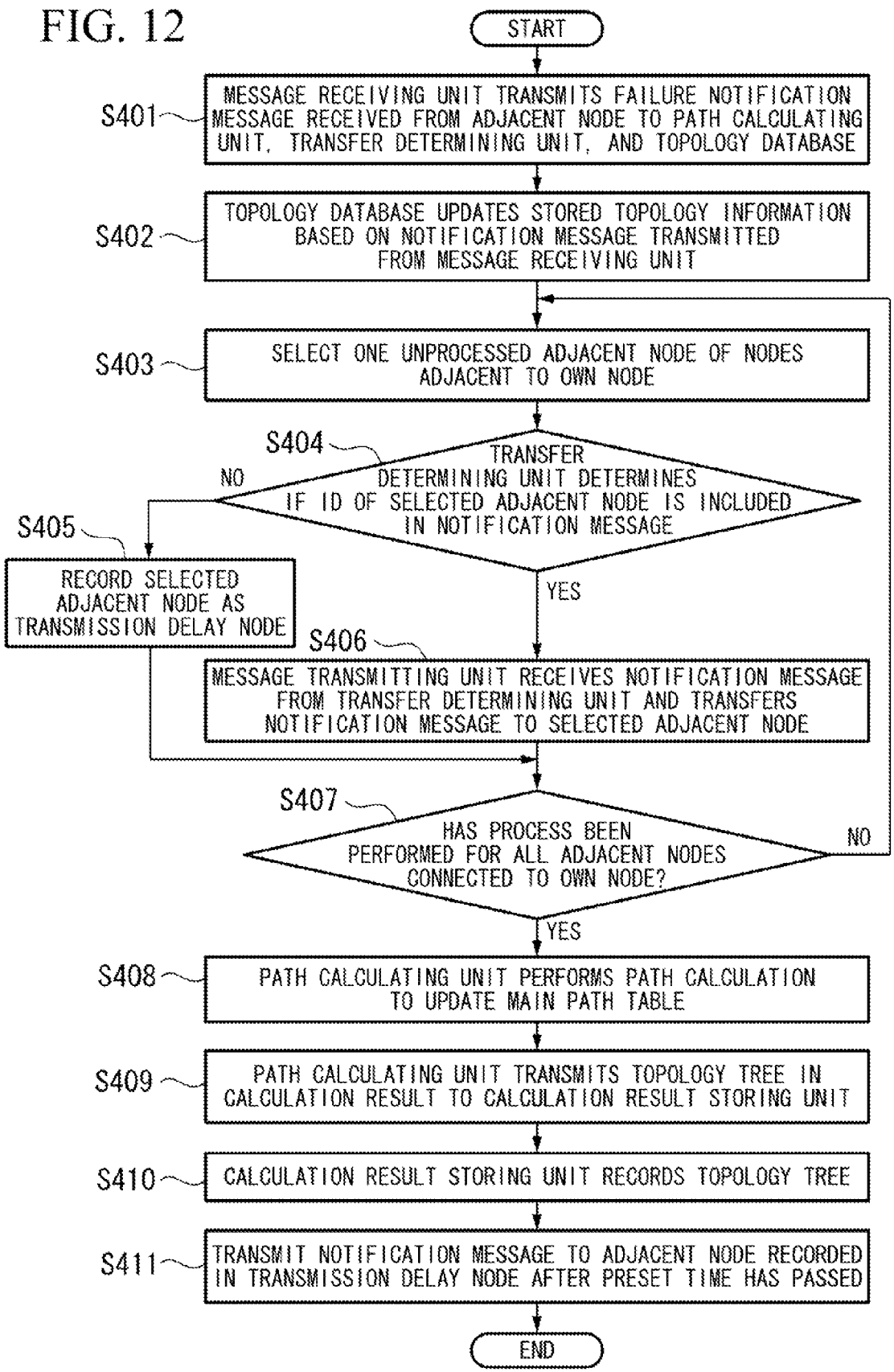
FIG. 12 is a flowchart showing an operation of a node apparatus, which is not connected to a failure link, according to the second exemplary embodiment of the present invention.

The operation of the node not connected to the failure link is explained with reference to FIG. 12.

At first, the message receiving unit 252 transmits a failure notification message received from the adjacent node to the path calculating unit 254, the transfer determining unit 258, and the topology database 253 (step S401). The topology database 253 updates the stored topology information based on the notification message transmitted from the message receiving unit 252 (step S402).

Then the transfer determining unit 258 selects one adjacent node that has not performed the process, of the nodes adjacent to the own node (step S403). The transfer determining unit 258 checks whether an ID of the selected adjacent node is included in the notification message (step S404). When the ID of the selected adjacent node is included in the notification message, the processing proceeds to step S406. When the ID of the selected adjacent node is not included in the notification message, the processing proceeds to step S405. The transfer determining unit 258 records the selected adjacent node as a transmission delay node in step S405, and the processing proceeds to step S407. In step S406, the message transmitting unit 251 receives the notification message from the transfer determining unit 258 and transfers the notification message to the selected adjacent node, and the processing proceeds to step S407. In step S407, the transfer determining unit 258 checks whether the process has been performed for all the adjacent nodes connected to the own node. When the process has not been performed for all the nodes, the processing returns to step S403, and when the process has been performed for all the nodes, the processing proceeds to the next process.

Next the path calculating unit 254 performs path calculation based on the topology information recorded in the topology database 253, and updates the main path table (step S408). The path calculating unit 254 then transmits the shortest path tree in the calculation result to the calculation result storing unit 257 (step S409).

Next the calculation result storing unit 257 records the shortest path tree transmitted from the path calculating unit 254 (step S410). Then after the time set by setting or the like has passed, the message transmitting unit 251 transmits the notification message to the node recorded as a transmission delay node (step S411), to finish the process. By the above process, the notification message is quickly propagated to the calculation-requiring node, and a delay is inserted in the message addressed to other nodes, thereby realizing temporal processing load distribution.

This exemplary embodiment may be combined with the operation of performing path calculation only by the node recorded in the notification message in the first exemplary embodiment and used.

Moreover, in this exemplary embodiment, when the ID of the adjacent node is not included in the notification message, the notification message is transmitted to the adjacent node after the time set by setting or the like has passed. However, when the ID of the adjacent node is not included in the notification message, an operation may be performed where the notification message is not transmitted to the adjacent node.

<Third Exemplary Embodiment>

A third exemplary embodiment of the present invention is explained next with reference to FIGS. 13 and 14.

Figure 13:
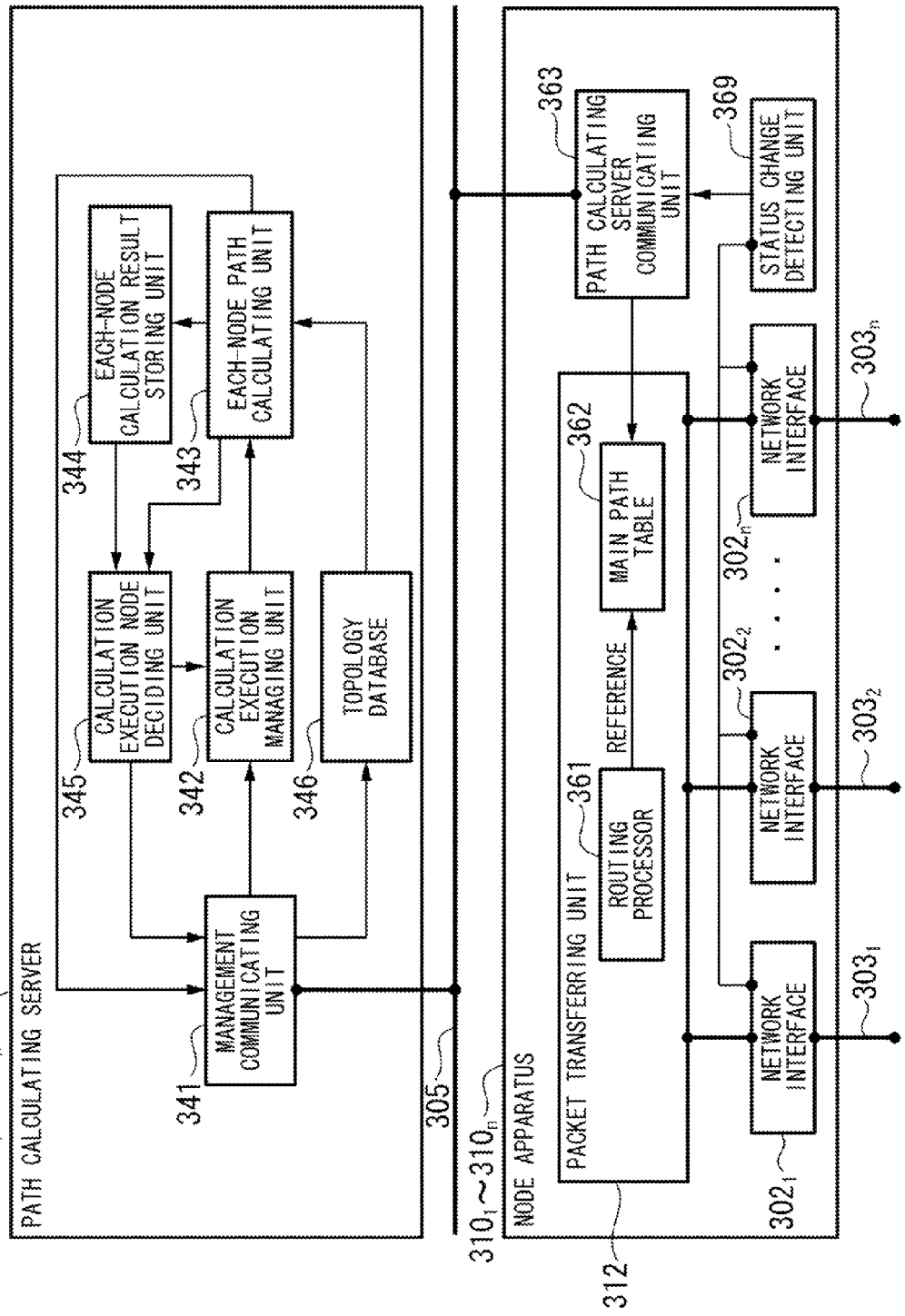
FIG. 13 is a block diagram showing a configuration of a node apparatus and a path calculating server according to a third exemplary embodiment of the present invention.

FIG. 13 shows the third exemplary embodiment of the present invention. The third exemplary embodiment is largely different from the first exemplary embodiment (FIG. 1) in that path calculating servers (path control apparatuses) $340_1$ to $340_m$ are provided outside of node apparatuses (path control apparatuses) $310_1$ to $310_p$.

Figure 14:
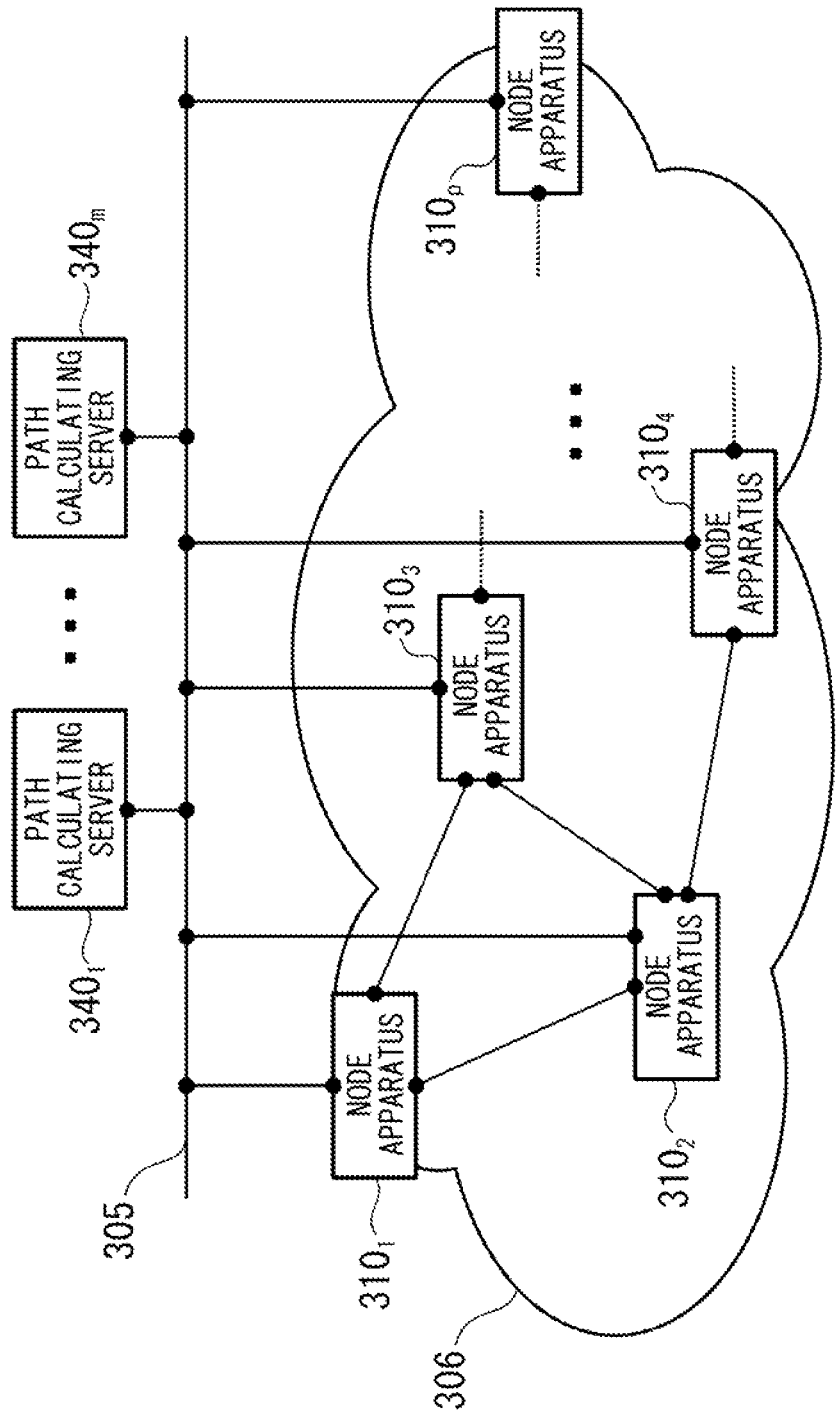
FIG. 14 is a network diagram in which the node apparatus and the path calculating server in the third exemplary embodiment of the present invention are arranged.

FIG. 14 shows an entire network when the present exemplary embodiment is applied. There is a management network 305 to which the path calculating servers $340_1$ to $340_m$ and each of the node apparatuses $310_1$ to $310_p$ are connected, in addition to a network 306 for data communication formed by connecting each of the node apparatuses.

In the second exemplary embodiment, each of the node apparatuses autonomously determines the path. On the other hand, in the present exemplary embodiment, the path calculating servers $340_1$ to $340_m$ calculate a path for each node, and transmit calculated path information to each of the node apparatuses $310_1$ to $310_p$ via the management network 305. By this configuration, each of the node apparatuses need not include a path control unit, thereby providing an advantage in that the configuration of the node apparatus becomes simple.

The respective path calculating servers $340_1$ to $340_m$ handle path calculation for one or a plurality of node apparatus. It is allocated beforehand by setting or the like which path calculating server handles which node apparatus. When a link failure occurs in this configuration, conventionally, recalculation of the path needs to be performed for all node apparatuses. In the present exemplary embodiment, however, a node apparatus that requires path calculation is decided, and only the path is recalculated for the decided node apparatus. As a result, reduction of load on the path calculating servers $340_1$ to $340_m$ is realized.

The configuration in the present exemplary embodiment is explained with reference to FIG. 13. The node apparatuses $310_1$ to $310_n$ in FIG. 13 include a path calculating server communicating unit 363 instead the path control unit 11, which is different from the node apparatus according to the first exemplary embodiment. The path calculating server communicating unit 363 receives path information from the path calculating servers $340_1$ to $340_n$ and registers the path information in a main path table 362. Moreover, when a status change detecting unit 369 detects a link failure, the path calculating server communicating unit 363 notifies the path calculating servers $340_1$ to $340_n$ of the link failure.

The path calculating servers $340_1$ to $340_n$ include a management communicating unit 341, a calculation execution managing unit 342, an each-node path calculating unit 343, an each-node calculation result storing unit 344, and a calculation execution node deciding unit 345.

The management communicating unit 341 notifies the node apparatus of the path information calculated by the each-node path calculating unit 343, and receives the link failure notification from the node apparatus. The calculation execution managing unit 342 instructs the each-node path calculating unit 343 to calculate the path according to the message received from the management communicating unit 341 or the decision of the calculation execution node deciding unit 345. The each-node path calculating unit 343 calculates the path information to be used by each node apparatus handled by the path calculating server. The each-node calculation result storing unit 344 records the shortest path tree obtained by a calculation process performed by the each-node path calculating unit 343. The calculation execution node deciding unit 345 compares the shortest path tree established based on the topology before the occurrence of a link failure stored in the each-node calculation result storing unit 344 and the shortest path tree established based on the topology after the occurrence of the link failure calculated by the each-node path calculating unit 343 to decide a calculation-requiring node.

Figure 15A:
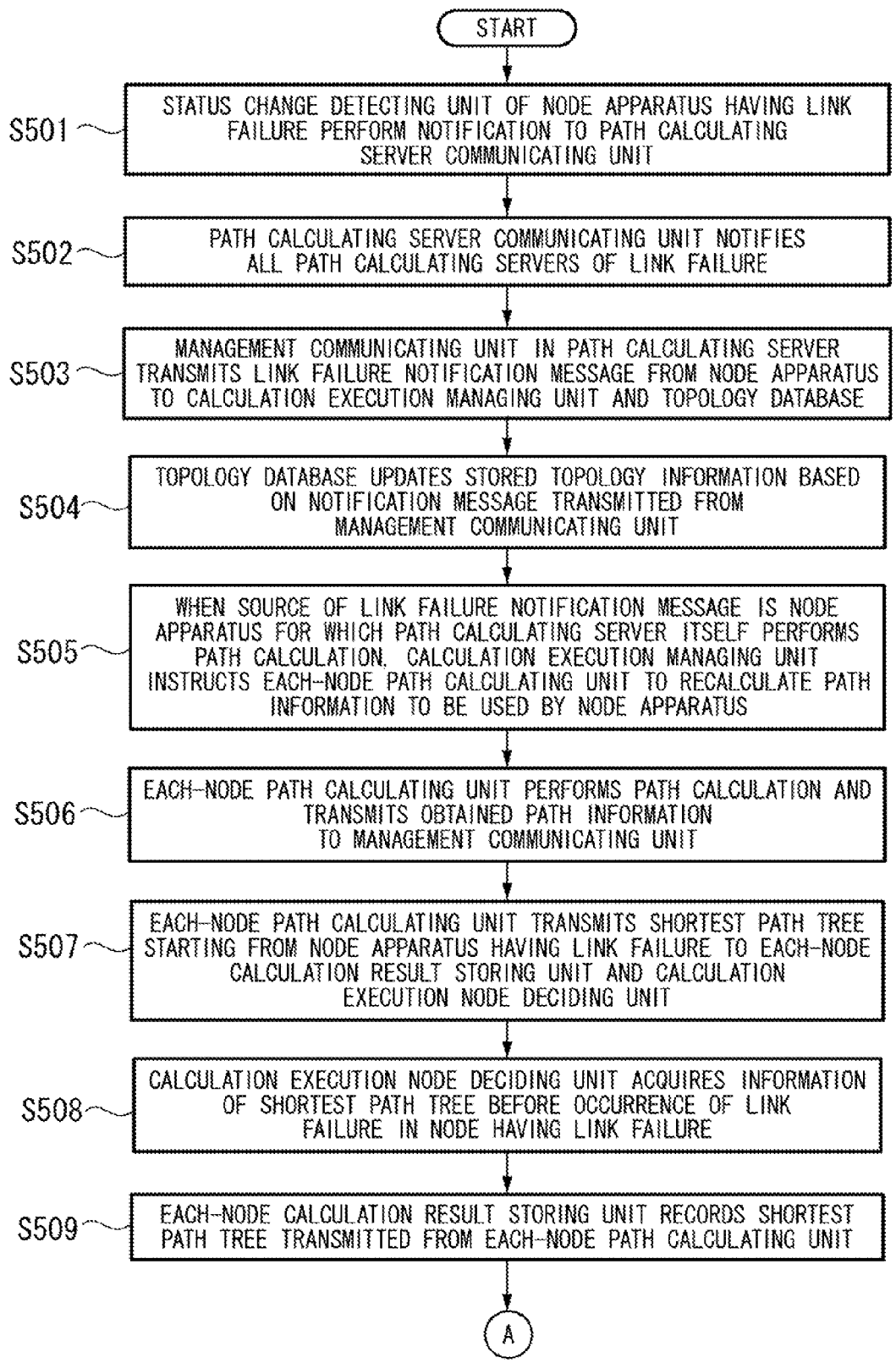
FIGS. 15A and 15B are a flowchart showing an operation of the node apparatus and the path calculating server according to the third exemplary embodiment of the present invention.
Figure 15B:
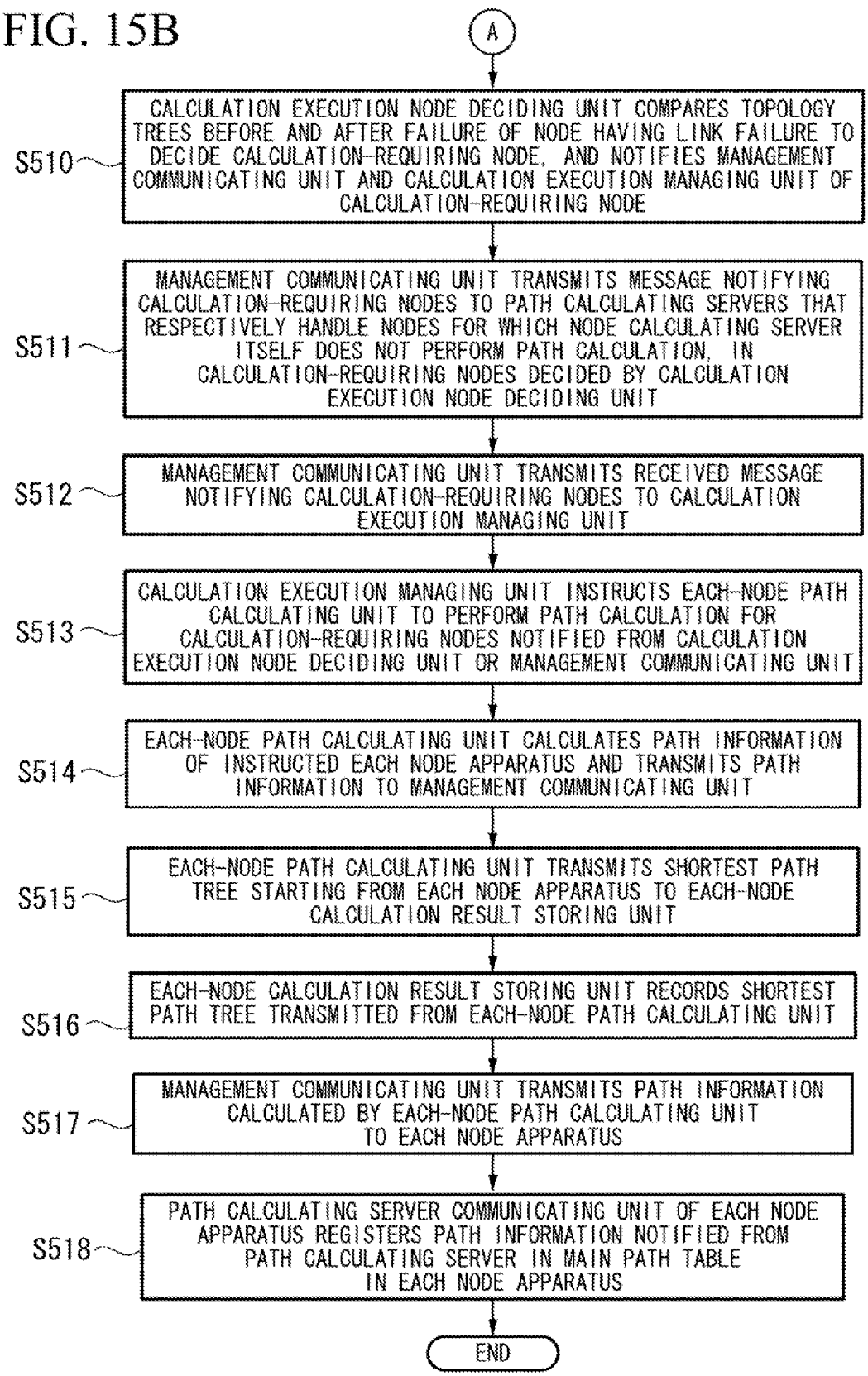

Next the operation in the present exemplary embodiment is explained with reference to FIGS. 15A and 15B. The status change detecting unit 369 of a node apparatus having a link failure performs notification to the path calculating server communicating unit 363 (step S501).

The path calculating server communicating unit 363 notifies all the path calculating servers $340_1$ to $340_n$ of the link failure (step S502). The management communicating unit 341 in the path calculating servers $340_1$ to $340_n$ transmits the link failure notification message from the node apparatus 310 ($310_1$ to $310_n$) to the calculation execution managing unit 342 and a topology database 346 (step S503).

Then the topology database 346 updates the stored topology information based on the notification message transmitted from the management communicating unit 341 (step S504). When the source of the link failure notification message received by the management communicating unit 341 is a node apparatus for which the node calculating server itself performs path calculation, the calculation execution managing unit 342 instructs the each-node path calculating unit 343 to recalculate the path information to be used by the node apparatus (step S505).

The each-node path calculating unit 343 performs path calculation based on the topology information stored in the topology database 346, and transmits the obtained path information to the management communicating unit 341 (step S506). The each-node path calculating unit 343 transmits the shortest path tree starting from the node apparatus 310 having the link failure obtained in the calculation process in step S506 to the each-node calculation result storing unit 344 and the calculation execution node deciding unit 345 (step S507).

Next the calculation execution node deciding unit 345 acquires the information of the shortest path tree established before the occurrence of the link failure, which is a calculation result one before in the node having the link failure, stored in the each-node calculation result storing unit 344 (step S508). The each-node calculation result storing unit 344 records the shortest path tree transmitted from the each-node path calculating unit 343 (step S509).

The calculation execution node deciding unit 345 compares the shortest path tree established before the occurrence of failure of the node having the link failure and the shortest path tree established after the occurrence of failure of the node, to decide a calculation-requiring node. Moreover, the calculation execution node deciding unit 345 notifies the management communicating unit 341 and the calculation execution managing unit 342 of the calculation-requiring nodes (step S510). When there is a node, for which the node calculating server itself does not perform path calculation, in the calculation-requiring nodes decided by the calculation execution node deciding unit 345, the management communicating unit 341 transmits a message notifying the calculation-requiring nodes to the path calculating servers $340_1$ to $340_m$ that respectively handle each of these calculation-requiring nodes (step S511). Upon reception of the message notifying the calculation-requiring nodes from other path calculating servers $340_1$ to $340_n$, the management communicating unit 341 transmits the message to the calculation execution managing unit 342 (step S512).

The calculation execution managing unit 342 selects each node apparatus, for which the path calculating server itself performs path calculation, from the calculation-requiring nodes decided by the calculation execution node deciding unit 345 or the calculation-requiring nodes in the notification message received by the management communicating unit 341, and instructs the each-node path calculating unit 343 to calculate the path (step S513). The each-node path calculating unit 343 calculates the path information for each node apparatus instructed from the calculation execution managing unit 342, and transmits a calculation result to the management communicating unit 341, respectively (step S514). The each-node path calculating unit 343 transmits the shortest path tree starting from each node apparatus 310 obtained in the calculation process in step S514 to the each-node calculation result storing unit 344 (step S515). The each-node calculation result storing unit 344 records the shortest path tree transmitted from the each-node path calculating unit 343 (step S516).

The management communicating unit 341 transmits the path information calculated by the each-node path calculating unit 343 in steps S506 and S514 to the each node apparatus 340 (step S517). The path calculating server communicating unit 363 of the each node apparatus registers the path information notified from the path calculating servers $340_1$ to $340_n$ in the main path table 362 in each node apparatus 310 (step S518).

The process of deciding the path-requiring node in step S510 is the same as the process in the first exemplary embodiment of the present invention.

According to these operations, path calculation can be performed only for a node apparatus that requires recalculation of the path with respect to a link failure, thereby enabling to reduce the load on the path calculating servers $340_1$ to $340_m$.

<Fourth Exemplary Embodiment>

Figure 16:
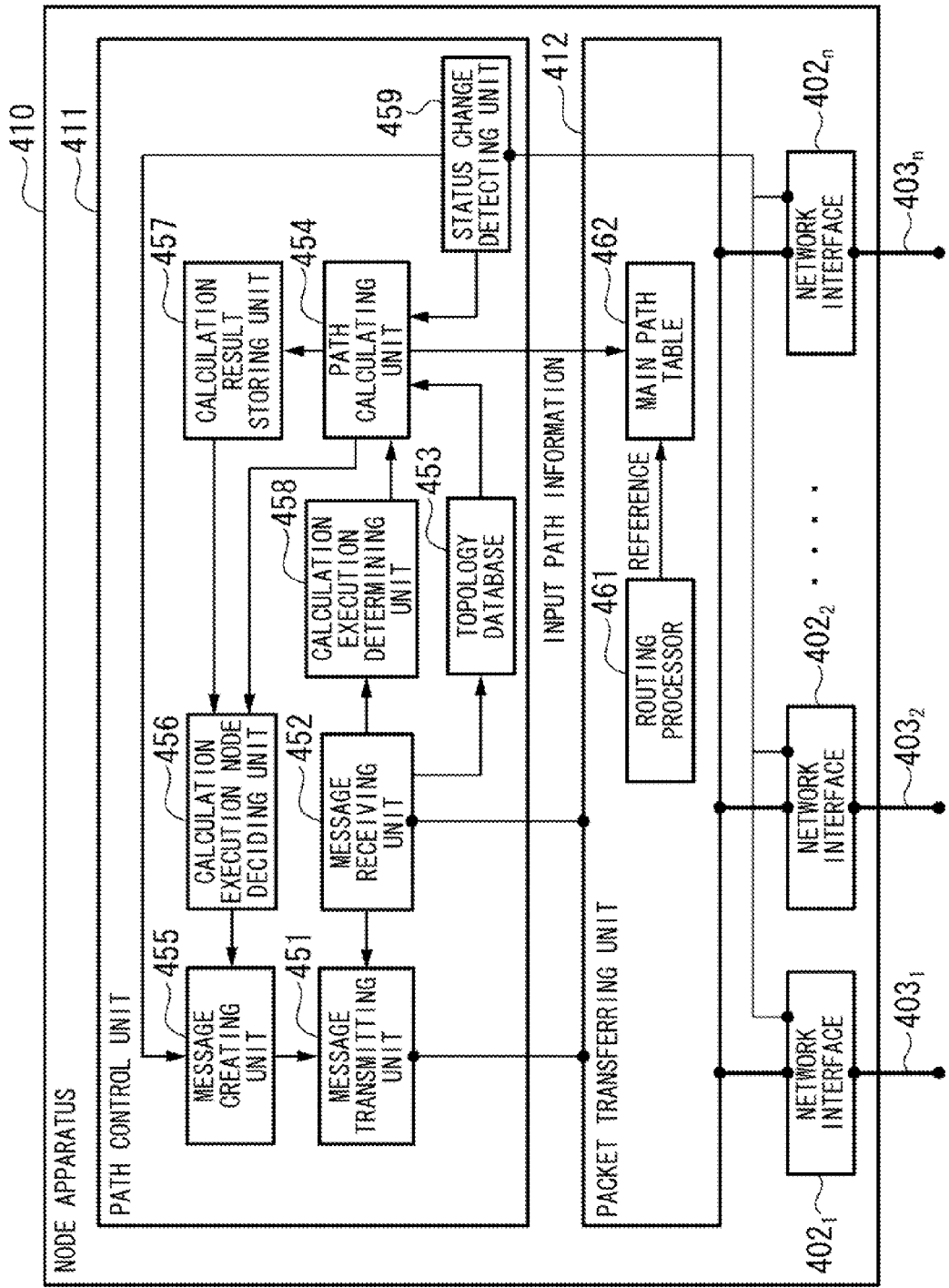
FIG. 16 is a block diagram showing a configuration of a node apparatus according to a fourth exemplary embodiment of the present invention.

A fourth exemplary embodiment of the present invention is explained next. FIG. 16 shows the fourth exemplary embodiment of the present invention. A path control unit 411, a packet transferring unit 412, external networks $403_1$ to $403_n$, and network interfaces $402_1$ to $402_n$ of a node apparatus (path control apparatus) 410 according to the fourth exemplary embodiment of the present invention are the same as the path control unit 11, the packet transferring unit 12, the external networks $3_1$ to $3_n$, and the network interfaces $2_1$ to $2_n$ of the node apparatus 10 (FIG. 1) according to the first exemplary embodiment. Furthermore, a message transmitting unit 451, a message receiving unit 452, a topology database 453, a path calculating unit 454, a message creating unit 455, a calculation result storing unit 457, a calculation execution determining unit 458, and a status change detecting unit 459 of the control unit 411 in the fourth exemplary embodiment are the same as the message transmitting unit 51, the message receiving unit 52, the topology database 53, the path calculating unit 54, the message creating unit 55, the calculation result storing unit 57, the calculation execution determining unit 58, and the status change detecting unit 59 of the path control unit 11 in the first exemplary embodiment. Moreover, a routing processor 461 and a main path table 462 of the packet transferring unit 412 in the fourth exemplary embodiment are the same as the routing processor 61 and the main path table 62 of the packet transferring unit 12 in the first exemplary embodiment.

In the fourth exemplary embodiment, the decision of a node by a calculation execution node deciding unit 456 is different from that by the calculation execution node deciding unit 56 in the first exemplary embodiment. That is, in this exemplary embodiment, the calculation execution node deciding unit 456 compares the shortest path tree established before the occurrence of a failure with the shortest path tree established after the occurrence of the failure to obtain the maximum value of the cost value from the own node to a node requiring path calculation, and notifies the message creating unit 455 of the obtained value. Furthermore the message creating unit 455 creates a notification message including a failure link and the obtained maximum value of the cost, and transmits the notification message to the message transmitting unit 451.

In the aforementioned first exemplary embodiment, all IDs for identifying the calculated nodes requiring path update are included in the message in the path control protocol and transmitted by the node that has detected a failure. However, when the number of nodes requiring path update increases, the message size increases.

In this exemplary embodiment, the node that has detected a failure determines up to which level of the cost value of the node from a failure location update is required, of the nodes requiring update, includes the cost value in a path control message, and transmits the message. Each node having receiving the path control message compares a distance (cost value) between the node that has detected the failure, which is a message sender, and the own node, to decide whether the own node needs to perform path calculation. A functional configuration of the node apparatus according to the present exemplary embodiment is the same as that in the first exemplary embodiment.

At first an operation of a node connected to the failure link in the present exemplary embodiment is explained with reference to FIG. 17.

Figure 17:
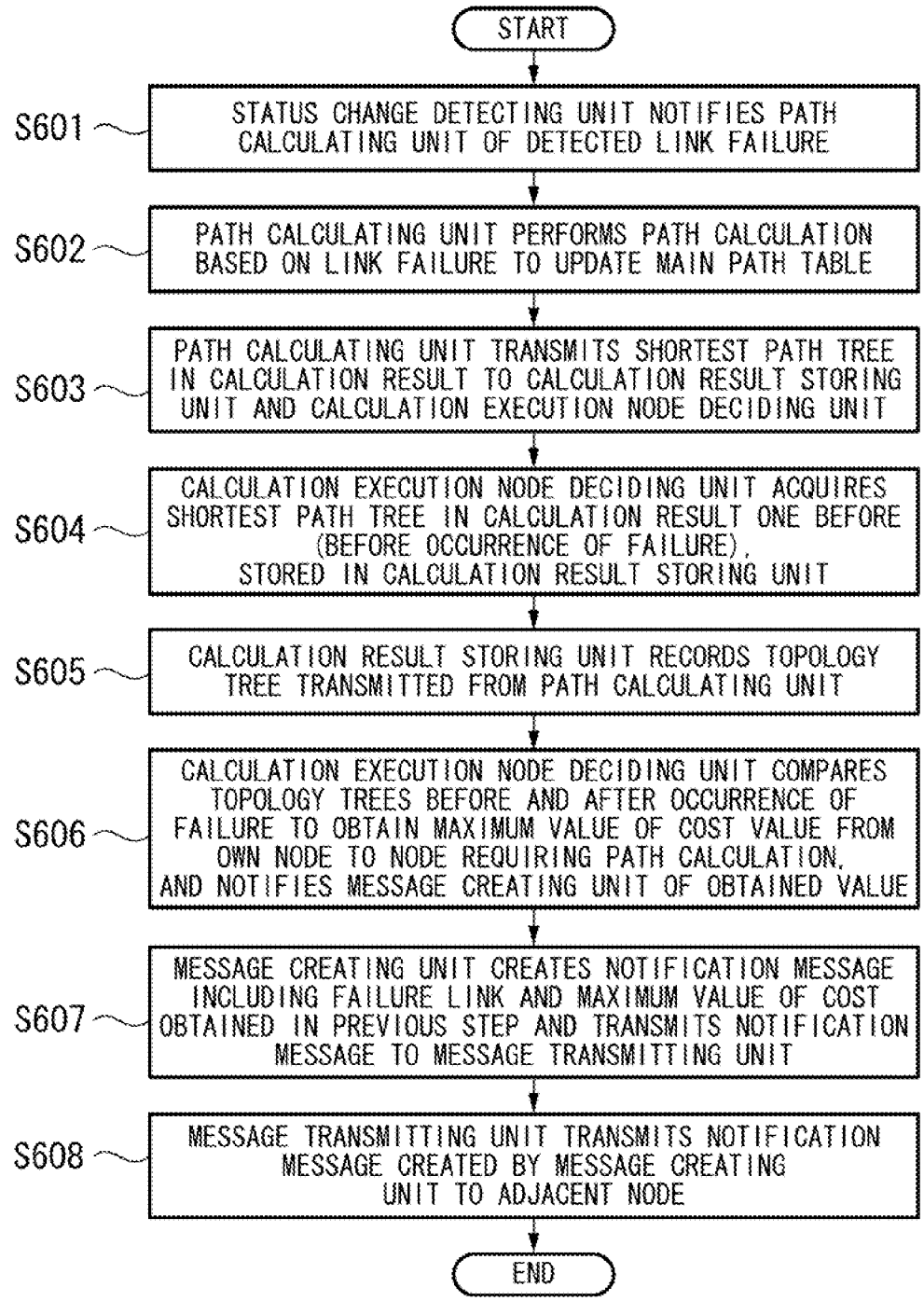
FIG. 17 is a flowchart showing an operation of the node apparatus connected to a failure link according to the fourth exemplary embodiment of the present invention.

In FIG. 17, the status change detecting unit 459 notifies the path calculating unit 454 of the detected link failure (step S601). The path calculating unit 454 performs path calculation based on the topology information in which the failure link notified by the status change detecting unit 459 is excluded from the topology information stored in the topology database 453, and updates the main path table 462 (step S602).

Next the path calculating unit 454 transmits the shortest path tree in the calculation result to the calculation result storing unit 457 and the calculation execution node deciding unit 456 (step S603).

Then the calculation execution node deciding unit 456 acquires the information of the shortest path tree established before the occurrence of link failure, which is the calculation result one before, stored in the calculation result storing unit 457 (step S604). The calculation result storing unit 457 records the shortest path tree transmitted from the path calculating unit 454 (step S605).

The calculation execution node deciding unit 456 compares a topology tree established before the occurrence of the failure with a topology tree established after the occurrence of the failure to obtain the maximum value of the cost value from the own node to the node requiring path calculation, and notifies the message creating unit 455 of the obtained value (step S606). The message creating unit 455 creates a notification message including the failure link notified from the status change detecting unit 459 and the maximum value of the cost decided by the calculation execution node deciding unit 456, and transmits the notification message to the message transmitting unit 451 (step S607). The message transmitting unit 451 transmits the notification message created by the message creating unit 455 to an adjacent node (step S608).

When compared with the first exemplary embodiment shown in FIG. 3, the processes in steps S606 and S607 are different. In step S606, the calculation execution node deciding unit 456 compares the shortest path tree established before the occurrence of the failure and the shortest path tree established after the occurrence of the failure to obtain the maximum value of the cost value from the own node to the node requiring path calculation, and notifies the message creating unit of the value. In step S607, the message creating unit 455 creates a notification message including the failure link and the maximum value of the cost obtained in step S606, and transmits the notification message to the message transmitting unit 451.

The notification message created by the message creating unit 455 in the process in step S607 in FIG. 17 is explained next.

Figure 18:
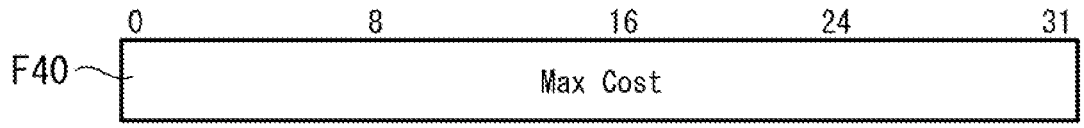
FIG. 18 is a flowchart showing a process of calculating the maximum cost value according to the fourth exemplary embodiment of the present invention.

FIG. 18 shows a packet format of an update distance cost value LSA in the present exemplary embodiment. The packet format is arranged following the LSA header shown in FIG. 5. The maximum value of the cost obtained in the process in step S606 is stored in a max cost field F40 in FIG. 18.

Figure 19:
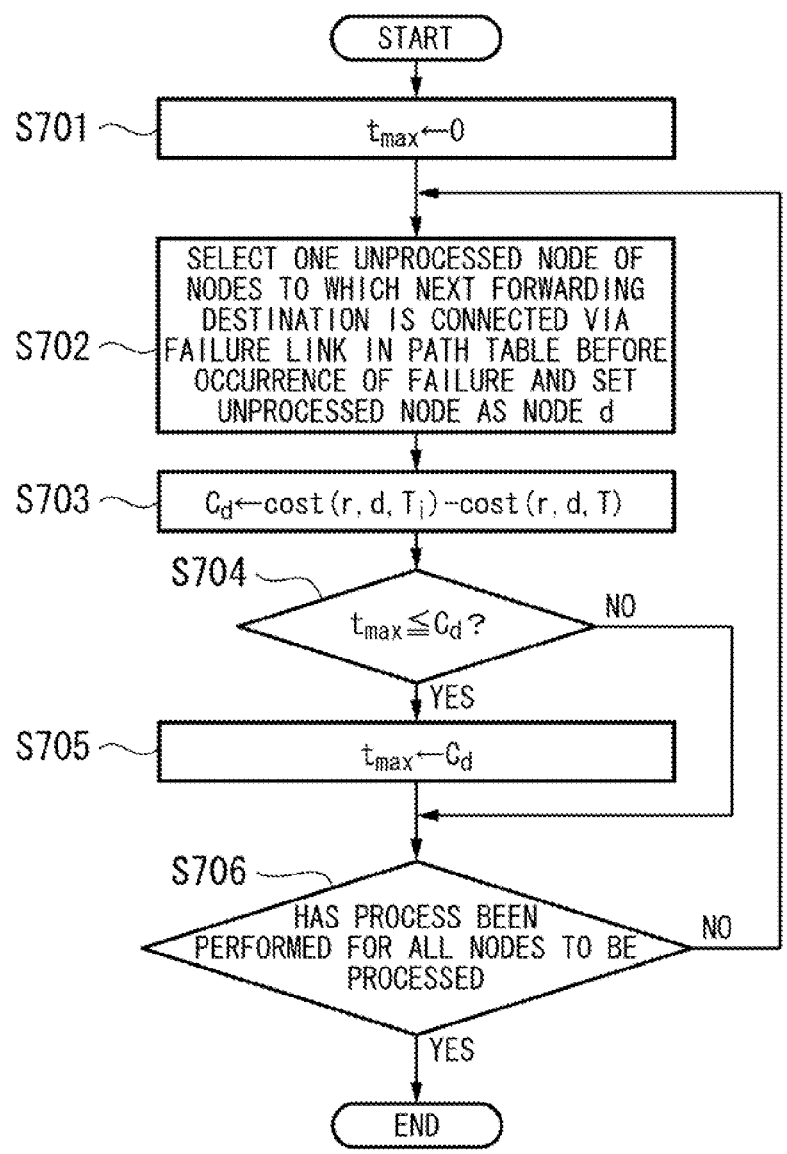
FIG. 19 is a flowchart showing an operation of the node apparatus, which is not connected to the failure link, according to the fourth exemplary embodiment of the present invention.

The detailed process in step S606 in FIG. 17 is explained next with reference to FIG. 19.

At first a variable $t_{max}$ is prepared, and 0 is set as the value thereof (step S701). Then a node connected to the next forwarding destination via a failure link in the path table before the occurrence of the failure is designated as a processing target, a node, for which subsequent steps have not been processed, is selected, and the selected node is set as node d (step S702). Then a value is obtained by subtracting the cost for a path from the own node to node d in the shortest path tree before the occurrence of the failure from the cost for a path from the own node to node d in the shortest path tree $T_i$ after the occurrence of the failure, and the obtained value is referred to as $C_d$ (step S703). Then the values of $t_{max}$ and $C_d$ are compared with each other. When $t_{max}$ is larger than $C_d$, the processing proceeds to step S706 (step S704). When $t_{max}$ is smaller than or equal to $C_d$ in step S704, the value of $t_{max}$ is set as $C_d$ (step S705). Then if the processes after steps S703 have not been performed with respect to all the nodes as the processing target, the processing returns to step S702, or otherwise, all the processes are finished (step S701). The value of $t_{max}$ at the time of finishing the process becomes the cost value to be notified.

An operation of a node that is not connected to the failure link is explained next with reference to FIG. 20.

The message receiving unit 452 transmits a failure notification message received from an adjacent node to the message transmitting unit 451, the calculation execution determining unit 458, and the topology database 453 (step S801). Then the topology database 453 updates the stored topology information based on the notification message transmitted from the message receiving unit 452 (step S802). The message transmitting unit 451 transfers the notification message transmitted from the message receiving unit 452 to another adjacent node (step S803).

A transfer determining unit compares a distance between the own node and a failure location with the cost value in the communication message (step S804). When the cost value notified in step S804 is smaller than the distance (cost value) between the own node and the failure location, all the processes are finished.

When the cost value notified in step S804 is larger than or equal to the distance (cost value) between the own node and the failure location, the path calculating unit 454 performs path calculation based on the topology information stored in the topology database 453, and updates the main path table 462 (step S805).

Next the path calculating unit 454 transmits the shortest path tree in the calculation result to the calculation result storing unit 457 (step S806). The calculation result storing unit 457 records the shortest path tree transmitted from the path calculating unit 454 (step S807), to finish all the processes. By this operation, the node that is not connected to the failure link performs path calculation only when the cost value in the notification message is larger than or equal to the distance (cost value) between the own node and the failure location, thereby enabling to keep the processing load on the entire network low.

Figure 10:
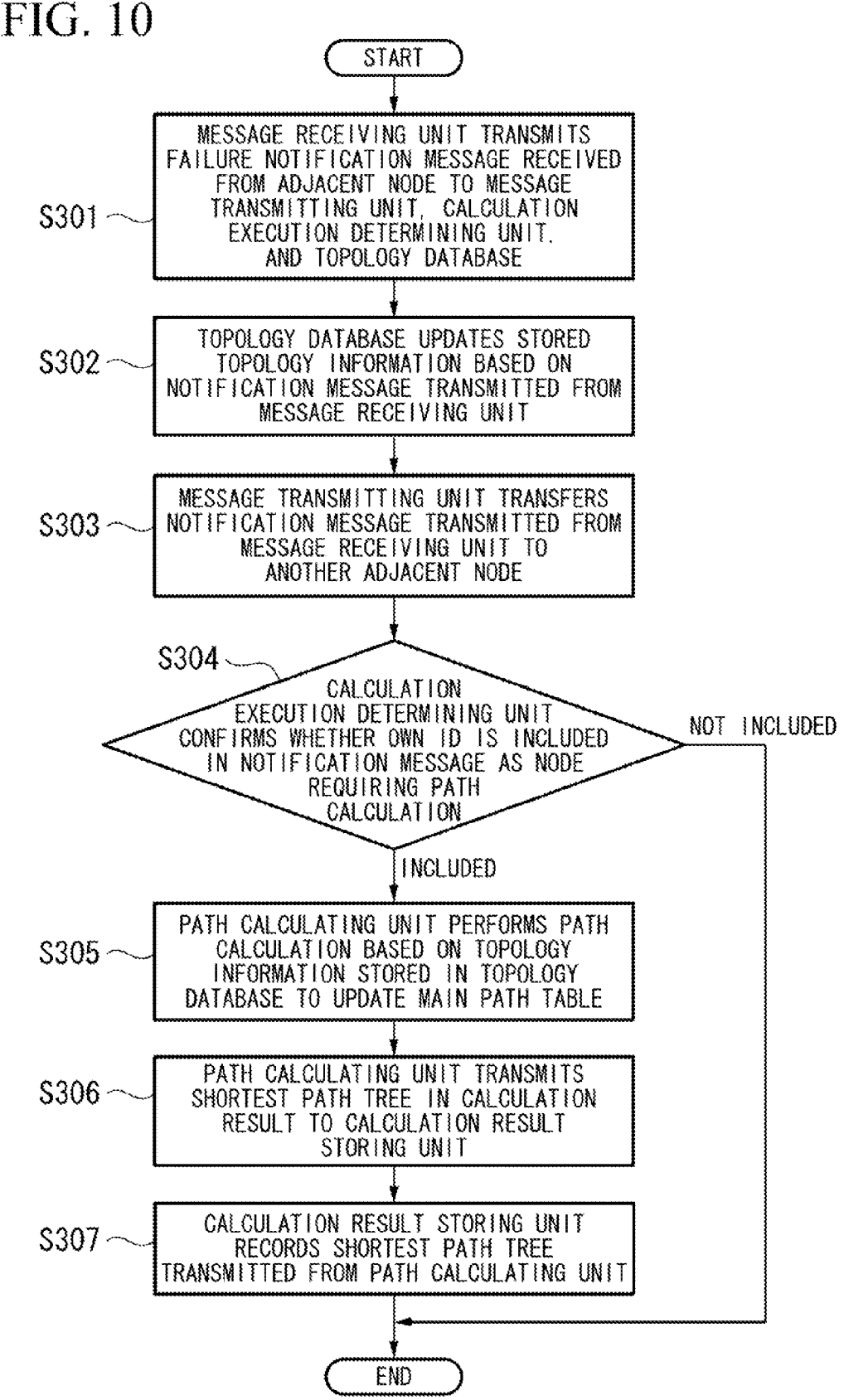
FIG. 10 is a flowchart showing an operation of a node apparatus, which is not connected to a failure link, according to the first exemplary embodiment of the present invention.

When compared with the operation performed by the node that is not connected to the failure link in the first exemplary embodiment shown in FIG. 10, only the process in step S804 is different. In step S804, the transfer determining unit compares the distance (cost value) between the own node and the failure location with the cost value in the notification message. When the notified cost value is larger than the distance, it is determined that the own node requires path calculation, and the processes after step S805 are performed. When the notified cost value is smaller than, it is determined that the own node does not require path calculation, and all the processes are finished. The distance between the own node and the failure location indicates the cost for a path from the own node to the node apparatus connected to the failure link. The cost for the path to the node apparatus that has created the notification message received by the message receiving unit 452, that is, the node apparatus connected to the failure link, can be determined by referring to the shortest path tree stored in the calculation result storing unit in the own node apparatus.

Figure 20:
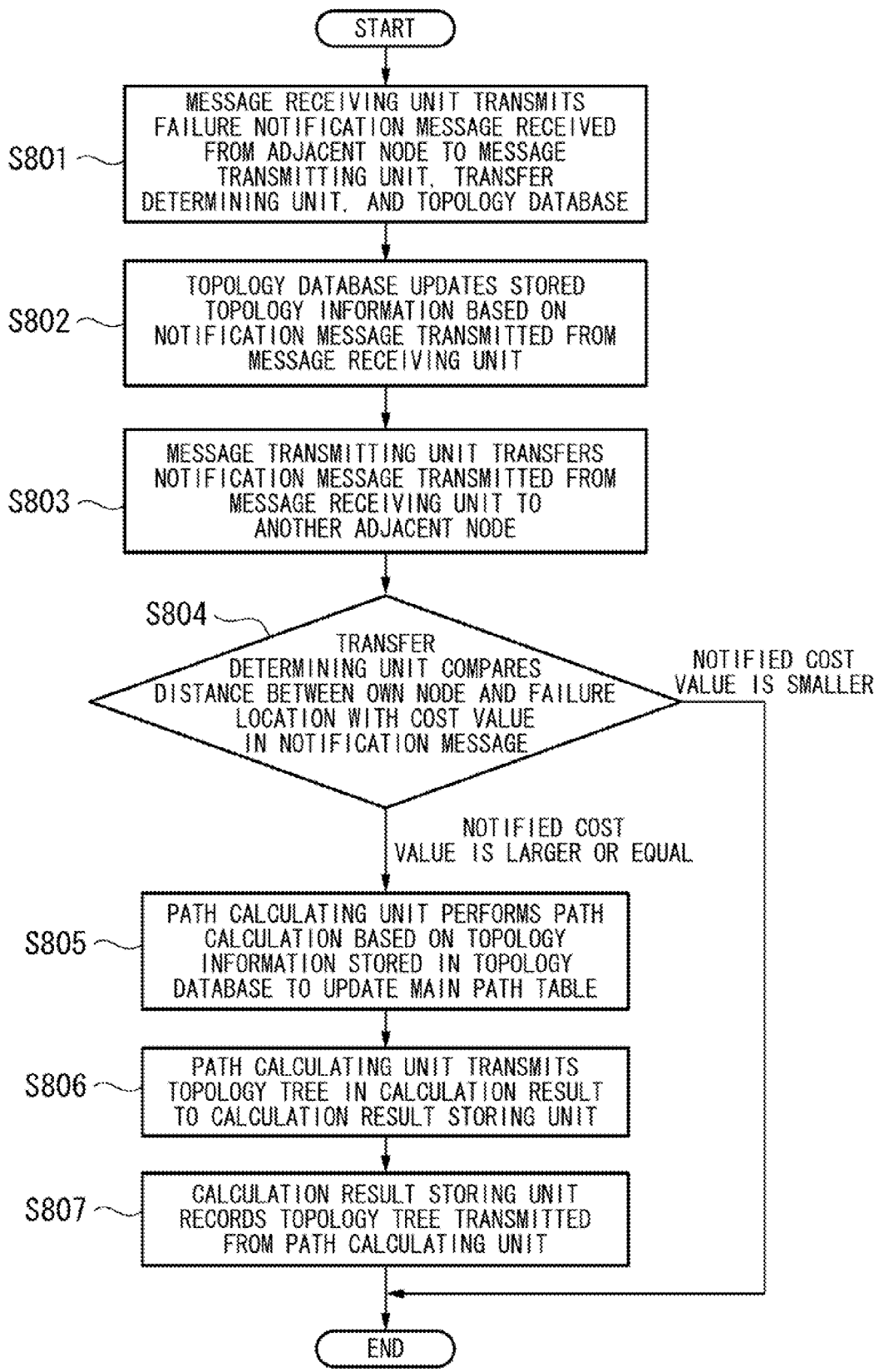
FIG. 20 is a flowchart showing a cost comparison process according to the fourth exemplary embodiment of the present invention.
Figure 21:
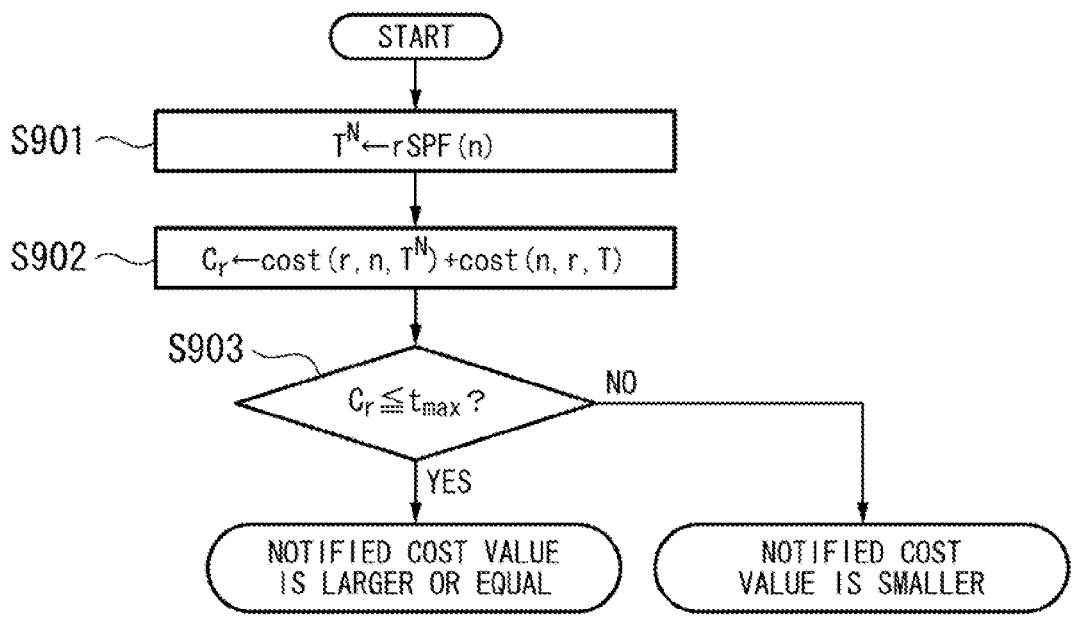
FIG. 21 is a diagram showing a configuration of each field of an update distance cost value LSA according to the fourth exemplary embodiment of the present invention.

Next a comparison process in step S804 in FIG. 20 is explained in detail with reference to FIG. 21. At first a shortest path tree $T^N$ in the opposite direction, which terminates at the own node (node n), is calculated (step S901). Then a total value $C_r$ of the cost for the path from the own node to node r in the shortest path tree T and the cost for the path from node r to the own node in the shortest path tree $T^N$ in the opposite direction, is obtained (step S902). $C_r$ is compared with the notified cost value $t_{max}$ (step S903).

By these operations, the size of a message to be notified can be reduced, and the processing load on the node that has detected a failure can be reduced.

The present exemplary embodiment can be used in combination with the second exemplary embodiment.

The functions performed by the node apparatus 10 shown in FIG. 1, the node apparatus 210 shown in FIG. 11, the node apparatus 310 and the path calculating server 340 shown in FIG. 13, and the node apparatus 410 shown in FIG. 16 may be executed by a program.

The program may be recorded on a computer readable recording medium, and the program recorded on the recording medium may be read into a computer system and executed, thereby executing a process for realizing the functions of the node apparatus 10 shown in FIG. 1, the node apparatus 210 shown in FIG. 11, the node apparatus 310 and the path calculating server 340 shown in FIG. 13, and the node apparatus 410 shown in FIG. 16. The "computer system" referred to herein includes an OS and hardware such as peripheral devices.

The "computer system" includes a home page providing environment (or display environment) in the case that the WWW system is used.

The "computer readable recording medium" is a portable medium such as a flexible disk, a magneto-optical disc, a ROM, and a CD-ROM, and a memory such as a hard disk incorporated in the computer system. The "computer readable recording medium" includes one that dynamically holds a program for a short time such as a communication wire when the program is transmitted via a communication line, for example, a network such as the Internet or telephone line, and one that holds the program for a certain time such as a volatile memory in the computer system, which becomes a server or a client in that case. The program may be one for realizing a part of the above-described functions, or one that realizes the functions in combination with the programs recorded beforehand in the computer system.

While the invention has been particularly shown and described with reference to exemplary embodiments and examples thereof, the invention is not limited to these embodiments and examples. It will be understood by those of ordinary skill in the art that various changes in form and details may be made therein without departing from the scope of the present invention as defined by the claims.

This application is the National Phase of PCT/JP2009/007203, filed Dec. 24, 2009, which is based upon and claims the benefit of priority from Japanese Patent Application No. 2008-333171, filed Dec. 26, 2008, the entire contents of which are incorporated herein by reference.

INDUSTRIAL APPLICABILITY

The present invention can be applied to a network system that dynamically performs path control, and a path control apparatus, a path control method, and a path control program in such a network system. According to the network system that dynamically performs path control, and the path control apparatus, the path control method, and the path control program in such a network system, reduction of load can be realized in the entire network, thereby enabling to realize improvement in the network stability.

REFERENCE SYMBOLS 10, 210, 310, 410 Node apparatus
11, 211, 311, 411 Path control unit
12, 212, 312, 412 Packet transferring unit
$2_1$ to $2_n$, $202_1$ to $202_n$, $302_1$ to $302_n$, $402_1$ to $402_n$ Network interface
$3_1$ to $3_n$, $203_1$ to $203_n$, $303_1$ to $303_n$, $403_1$ to $403_n$ Network interface
51, 251, 451 Message transmitting unit
52, 252, 452 Message receiving unit
53, 253, 453 Topology database
54, 254, 454 Path calculating unit
55, 255, 455 Message creating unit
56, 256, 456 Calculation execution node deciding unit
57, 257, 457 Calculation result storing unit
58, 458 Calculation execution determining unit
59, 259, 459 Status change detecting unit
61, 261, 461 Routing processor
62, 262, 462 Path table
258 Transfer determining unit
305 Management network
312 Packet transferring unit
341 Management communicating unit
342 Calculation execution managing unit
343 Each-node path calculating unit
344 Each-node calculation result storing unit
345 Calculation execution node deciding unit
346 Topology database
362 Main path table
363 Path calculating server communicating unit
369 Status change detecting unit

The invention claimed is:

1. A path control apparatus comprising:
a status change detecting unit implemented at least in hardware and that detects a status change of a network;
a path calculating unit implemented at least in hardware and that decides a path in accordance with the status of the network;
a calculation execution node deciding unit implemented at least in hardware, the calculation execution node deciding unit selecting a first node connected to a next forwarding destination via a failure link in a path table before an occurrence of the status change, the calculation execution node selecting a second node in a path from the path control apparatus to the first node in a first shortest path tree, the calculation execution node deciding unit deciding that the second node is a node apparatus in the network which needs a path update, when the calculation execution node deciding unit determines that a second value is smaller than or equal to a first value, the first value being obtained by subtracting a cost for a path from the path control apparatus to the first node in a second shortest path tree, from a cost for a path from the path control apparatus to the first node in the first shortest path tree, the second value being a total of a cost for a path from the path control apparatus to the second node in the second shortest path tree and a cost for a path from the second node to the path control apparatus in a third shortest path tree, the first shortest path tree being a shortest path tree after the occurrence of the status change, the second shortest path tree being a shortest path tree before the occurrence of the status change, the third shortest path tree being a shortest path tree in an opposite direction before the occurrence of the status change;
a message creating unit implemented at least in hardware and that creates a message showing the decided node apparatus which needs a path update; and
a message transmitting unit implemented at least in hardware and that transmits the message to the decided node apparatus which needs a path update.

2. The path control apparatus according to claim 1, wherein the calculation execution node deciding unit determines whether node apparatuses need a path update sequentially along the first shortest path tree.

3. The path control apparatus according to claim 1, further comprising:
a message receiving unit that receives a message created by another path control apparatus; and
a calculation execution determining unit that checks whether an identifier of the own path control apparatus is included in the message received by the message receiving unit, and instructs the path calculating unit to perform path calculation.

4. The path control apparatus according to claim 1, further comprising:
a message receiving unit that receives a message created by another path control apparatus; and
a transfer determining unit that checks whether an identifier of a node apparatus adjacent to the own path control apparatus is included in the message received by the message receiving unit, and instructs the message transmitting unit to transfer the message received by the message receiving unit.

5. The path control apparatus according to claim 1, further comprising:
a network interface connected to an external network,
wherein the status change detecting unit detects a status change of the network interface.

6. The path control apparatus according to claim 1, wherein the path control apparatus instructs the path calculating unit to perform path calculation, respectively, starting from each node apparatus decided by the calculation execution node deciding unit.

7. The path control apparatus according to claim 1, wherein the status change detecting unit receives a notification message of a status change of the network detected by another node apparatus.

8. A path control method for a path control apparatus, comprising the steps of:
- detecting, by the path control apparatus, a status change of a network;
- deciding, by the path control apparatus, a path in accordance with the status of the network;
- selecting, by the path control apparatus, a first node connected to a next forwarding destination via a failure link in a path table before an occurrence of the status change;
- selecting, by the path control apparatus, a second node in a path from the path control apparatus to the first node in a first shortest path tree;
- deciding, by the path control apparatus, that the second node is a node apparatus in the network which needs a path update when determining, by the path control apparatus, that a second value is smaller than or equal to a first value, the first value being obtained by subtracting a cost for a path from the path control apparatus to the first node in a second shortest path tree, from a cost for a path from the path control apparatus to the first node in the first shortest path tree, the second value being a total of a cost for a path from the path control apparatus to the second node in the second shortest path tree and a cost for a path from the second node to the path control apparatus in a third shortest path tree, the first shortest path tree being a shortest path tree after the occurrence of the status change, the second shortest path tree being a shortest path tree before the occurrence of the status change, the third shortest path tree being a shortest path tree in a opposite direction before the occurrence of the status change;
- creating, by the path control apparatus, a message showing the decided node apparatus which needs a path update; and
- transmitting, by the path control apparatus, the message to the decided node apparatus which needs a path update.

9. The path control method according to claim 8, wherein the step of deciding a node apparatus includes a step of determining whether node apparatuses need a path update sequentially along the first shortest path tree.

10. The path control method according to claim 8, further comprising the steps of:
- receiving a message created by another path control apparatus; and
- checking whether an identifier of the own path control apparatus is included in the message received by the step of receiving a message to determine whether to perform the step of deciding a path.

11. The path control method according to claim 8, further comprising the steps of:
- receiving a message created by another path control apparatus; and
- checking whether an identifier of a node apparatus adjacent to the path control apparatus is included in the message received by the step of receiving a message to determine whether to transfer the message received by the step of receiving a message.

12. The path control method according to claim 8, wherein in the step of detecting a status change, a status change of a network interface is detected.

13. The path control method according to claim 8, wherein in the step of deciding a path, path calculation starting from each node apparatus decided by the step of deciding a node apparatus is respectively performed.

14. The path control method according to claim 8, wherein the step of detecting a status change includes a step of receiving a notification message of a network status change detected by another node apparatus.

15. A non-transitory computer readable recording medium storing a path control program for causing a computer to execute the steps of:
- detecting a status change of a network;
- deciding a path in accordance with the status of the network;
- selecting a first node connected to a next forwarding destination via a failure link in a path table before an occurrence of the status change;
- selecting a second node in a path from the path control apparatus to the first node in a first shortest path tree;
- deciding that the second node is a node apparatus in the network which needs a path update when determining that a second value is smaller than or equal to a first value, the first value being obtained by subtracting a cost for a path from the path control apparatus to the first node in a second shortest path tree, from a cost for a path from the path control apparatus to the first node in the first shortest path tree the second value being a total of a cost for a path from the path control apparatus to the second node in the second shortest path tree and a cost for path from the second node to the path control apparatus n a third shortest path tree, the first shortest path tree being a shortest path tree after the occurrence of the status change, the second shortest path tree being a shortest path tree before the occurrence of the status change, the third shortest path tree being a shortest path tree in an opposite direction before the occurrence of the status change;
- creating a message showing the decided node apparatus which needs a path update; and
- transmitting the message to the decided node apparatus which needs a path update.

16. A network system comprising:
- a status change detecting unit implemented at least in hardware and that detects a status change of a network;
- a path calculating unit implemented at least in hardware and that decides a path in accordance with the status of the network;
- a calculation execution node deciding unit implemented at least in hardware, the calculation execution node deciding unit selecting a first node connected to a next forwarding destination via a failure link in a path table before an occurrence of the status change, the calculation execution node selecting a second node in a path from the path control apparatus to the first node in a first shortest path tree, the calculation execution node deciding unit deciding that the second node is a node apparatus in the network which needs a path update when the calculation execution node deciding unit determines that a second value is smaller than or equal to a first value the first value being obtained by subtracting a cost for a path from the path control apparatus to the first node n a second shortest path tree, from a cost for a path from the path control apparatus to the first node in the first shortest path tree, the second value being a total of a cost for a path from the path control apparatus to the second node in the second shortest path tree and a cost for a path from the second node to the path control apparatus in a third shortest path tree, the first shortest path tree being a shortest path tree after the occurrence of the status change the second shortest path tree being a shortest path tree before the occurrence of the status change the third shortest path tree being a shortest path tree in an opposite direction before the occurrence of the status change;

a message creating unit implemented at least in hardware and that creates a message showing the decided node apparatus which needs a path update; and a message transmitting unit implemented at least in hardware and that transmits the message to the decided node apparatus which needs a path update.

17. The path control apparatus according to claim 1, wherein:

the calculation execution node deciding unit subtracts the cost for the path from the path control apparatus to the first node in the second shortest path tree, from the cost for the path from the path control apparatus to the first node in the first shortest path tree, to obtain the first value; and the calculation execution node deciding unit adds up the cost for the path from the path control apparatus to the second node in the second shortest path tree and the cost for the path from the second node to the path control apparatus in the third shortest path tree, to obtain the second value.

18. The path control method according to claim 8, further comprising the steps of:

subtracting, by the path control apparatus, the cost for the path from the path control apparatus to the first node in the second shortest path tree, from the cost for the path from the path control apparatus to the first node in the first shortest path tree, to obtain the first value; and adding up, by the path control apparatus, the cost for the path from the path control apparatus to the second node in the second shortest path tree and the cost for the path from the second node to the path control apparatus in the third shortest path tree, to obtain the second value.

19. The non-transitory computer readable recording medium according to claim 15, wherein the path control program further causes a computer to execute the steps of:

subtracting the cost for the path from the path control apparatus to the first node in the second shortest path tree, from the cost for the path from the path control apparatus to the first node in the first shortest path tree, to obtain the first value; and adding up the cost for the path from the path control apparatus to the second node in the second shortest path tree and the cost for the path from the second node to the path control apparatus in the third shortest path tree, to obtain the second value.

20. The network system according to claim 16, wherein:

the calculation execution node deciding unit subtracts the cost for the path from the path control apparatus to the first node in the second shortest path tree, from the cost for the path from the path control apparatus to the first node in the first shortest path tree, to obtain the first value; and the calculation execution node deciding unit adds up the cost for the path from the path control apparatus to the second node in the second shortest path tree and the cost for the path from the second node to the path control apparatus in the third shortest path tree, to obtain the second value.

* * * * *